(12) United States Patent
Koponen et al.

(10) Patent No.: US 8,959,215 B2
(45) Date of Patent: Feb. 17, 2015

(54) NETWORK VIRTUALIZATION

(75) Inventors: Teemu Koponen, San Francisco, CA (US); Martin Casado, Portola Valley, CA (US); Paul S. Ingram, Menlo Park, CA (US); W. Andrew Lambeth, San Mateo, CA (US); Peter J. Balland, III, Dublin, CA (US); Keith E. Amidon, Los Altos, CA (US); Daniel J. Wendlandt, Palo Alto, CA (US)

(73) Assignee: Nicira, Inc., Palo Alto, CA (US)

( * ) Notice: Subject to any disclaimer, the term of this patent is extended or adjusted under 35 U.S.C. 154(b) by 510 days.

(21) Appl. No.: 13/177,536

(22) Filed: Jul. 6, 2011

(65) Prior Publication Data
US 2013/0060940 A1 Mar. 7, 2013

Related U.S. Application Data

(60) Provisional application No. 61/361,912, filed on Jul. 6, 2010, provisional application No. 61/361,913, filed on Jul. 6, 2010, provisional application No. 61/429,753, filed on Jan. 4, 2011, provisional application No.

(Continued)

(51) Int. Cl.
*G06F 15/16* (2006.01)
*H04L 12/931* (2013.01)
(Continued)

(52) U.S. Cl.
CPC ............ *H04L 49/70* (2013.01); *H04L 41/0896* (2013.01); *G06F 11/07* (2013.01)
USPC ........... 709/225; 709/223; 709/238; 709/208; 709/220; 370/397; 370/396; 370/469; 370/422

(58) Field of Classification Search
CPC ...... H04L 49/70; H04L 41/0983; G06F 11/01

USPC ................. 709/223, 238, 208, 201, 220, 225; 370/409, 397, 428, 400, 465, 396, 252, 370/254, 395.6, 422, 469; 711/206, 221
See application file for complete search history.

(56) References Cited

U.S. PATENT DOCUMENTS 5,265,092 A 11/1993 Soloway et al.
5,504,921 A 4/1996 Dev et al.
(Continued)

FOREIGN PATENT DOCUMENTS

EP 0737921 10/1996
EP 1653688 5/2006
(Continued)

OTHER PUBLICATIONS

Definition "hypervisor," http://searchservervirtualization.techtarget.com/definition/hypervisor, published Oct. 2006.*

(Continued)

*Primary Examiner* — Alina N Boutah
(74) *Attorney, Agent, or Firm* — Adeli LLP

(57) ABSTRACT

Some embodiments of the invention provide a robust scaling-out of network functionality by providing a software layer, called the network hypervisor, that sits between the network forwarding functions (i.e., the forwarding plane) and the network control interfaces (i.e., the control plane). The network hypervisor of some embodiments provides a logical abstraction of the network's forwarding functionality, so that network operators make their control decisions in terms of this abstraction, independent of the details of the underlying networking hardware. The network hypervisor of some embodiments may then "compile" commands placed against this abstraction into configurations of the underlying hardware. Accordingly, in some embodiments, there are two design challenges: (1) the choice of the network abstraction, and (2) the technology needed to compile the logical "abstract" controls into low-level configurations.

20 Claims, 8 Drawing Sheets

Related U.S. Application Data

61/429,754, filed on Jan. 4, 2011, provisional application No. 61/466,453, filed on Mar. 22, 2011, provisional application No. 61/482,205, filed on May 3, 2011, provisional application No. 61/482,615, filed on May 4, 2011, provisional application No. 61/482,616, filed on May 4, 2011, provisional application No. 61/501,743, filed on Jun. 27, 2011, provisional application No. 61/501,785, filed on Jun. 28, 2011.

(51) Int. Cl.
*H04L 12/24* (2006.01)
*G06F 17/30* (2006.01)
*G06F 11/07* (2006.01)

(56) References Cited

U.S. PATENT DOCUMENTS

| | | |
|---|---|---|
| 5,550,816 A | 8/1996 | Hardwick et al. |
| 5,729,685 A | 3/1998 | Chatwani et al. |
| 5,751,967 A | 5/1998 | Raab et al. |
| 5,796,936 A | 8/1998 | Watabe et al. |
| 5,926,463 A | 7/1999 | Ahearn et al. |
| 6,006,275 A | 12/1999 | Picazo, Jr. et al. |
| 6,055,243 A | 4/2000 | Vincent et al. |
| 6,104,699 A | 8/2000 | Holender et al. |
| 6,104,700 A | 8/2000 | Haddock et al. |
| 6,219,699 B1 | 4/2001 | McCloghrie et al. |
| 6,512,745 B1 | 1/2003 | Abe et al. |
| 6,539,432 B1 | 3/2003 | Taguchi et al. |
| 6,680,934 B1 | 1/2004 | Cain |
| 6,697,338 B1 | 2/2004 | Breitbart et al. |
| 6,735,602 B2 | 5/2004 | Childress et al. |
| 6,785,843 B1 | 8/2004 | McRae et al. |
| 6,912,221 B1 | 6/2005 | Zadikian et al. |
| 6,941,487 B1 | 9/2005 | Balakrishnan et al. |
| 6,959,002 B2 | 10/2005 | Wynne et al. |
| 6,963,585 B1 | 11/2005 | Le Pennec et al. |
| 6,999,454 B1 | 2/2006 | Crump |
| 7,042,912 B2 | 5/2006 | Ashwood Smith et al. |
| 7,046,630 B2 | 5/2006 | Abe et al. |
| 7,126,923 B1 | 10/2006 | Yang et al. |
| 7,158,972 B2 | 1/2007 | Marsland |
| 7,197,561 B1 | 3/2007 | Lovy et al. |
| 7,209,439 B2 | 4/2007 | Rawlins et al. |
| 7,263,290 B2 | 8/2007 | Fortin et al. |
| 7,283,473 B2 | 10/2007 | Arndt et al. |
| 7,286,490 B2 | 10/2007 | Saleh et al. |
| 7,342,916 B2 | 3/2008 | Das et al. |
| 7,343,410 B2 | 3/2008 | Mercier et al. |
| 7,359,971 B2 | 4/2008 | Jorgensen |
| 7,450,598 B2 | 11/2008 | Chen et al. |
| 7,463,579 B2 | 12/2008 | Lapuh et al. |
| 7,478,173 B1 | 1/2009 | Delco |
| 7,555,002 B2 | 6/2009 | Arndt et al. |
| 7,587,492 B2 | 9/2009 | Dyck et al. |
| 7,590,669 B2 | 9/2009 | Yip et al. |
| 7,606,260 B2 | 10/2009 | Oguchi et al. |
| 7,643,488 B2 | 1/2010 | Khanna et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,783,856 B2 | 8/2010 | Hashimoto et al. |
| 7,792,987 B1 | 9/2010 | Vohra et al. |
| 7,802,251 B2 | 9/2010 | Kitamura |
| 7,808,929 B2 | 10/2010 | Wong et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,856,549 B2 | 12/2010 | Wheeler |
| 7,885,276 B1 * | 2/2011 | Lin ............... 370/401 |
| 7,912,955 B1 | 3/2011 | Machiraju et al. |
| 7,925,661 B2 | 4/2011 | Broussard et al. |
| 7,936,770 B1 | 5/2011 | Frattura et al. |
| 7,937,438 B1 | 5/2011 | Miller et al. |
| 7,945,658 B1 | 5/2011 | Nucci et al. |
| 7,948,986 B1 | 5/2011 | Ghosh et al. |
| 7,953,865 B1 | 5/2011 | Miller et al. |
| 7,970,917 B2 | 6/2011 | Nakano et al. |
| 7,991,859 B1 | 8/2011 | Miller et al. |
| 7,995,483 B1 | 8/2011 | Bayar et al. |
| 8,027,354 B1 | 9/2011 | Portolani et al. |
| 8,031,633 B2 | 10/2011 | Bueno et al. |
| 8,032,899 B2 | 10/2011 | Archer et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,089,871 B2 | 1/2012 | Iloglu et al. |
| 8,130,648 B2 | 3/2012 | Kwan et al. |
| 8,131,852 B1 | 3/2012 | Miller et al. |
| 8,144,630 B1 | 3/2012 | Orr |
| 8,149,737 B2 | 4/2012 | Metke et al. |
| 8,155,028 B2 | 4/2012 | Abu-Hamdeh et al. |
| 8,161,152 B2 | 4/2012 | Ogielski et al. |
| 8,166,201 B2 | 4/2012 | Richardson et al. |
| 8,196,144 B2 * | 6/2012 | Kagan et al. ............. 718/104 |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,265,075 B2 | 9/2012 | Pandey |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,351,418 B2 | 1/2013 | Zhao et al. |
| 8,352,941 B1 * | 1/2013 | Protopopov et al. ............. 718/1 |
| 8,413,216 B2 | 4/2013 | Hughes et al. |
| 8,565,597 B2 | 10/2013 | Zheng |
| 8,612,627 B1 | 12/2013 | Brandwine |
| 8,644,188 B1 | 2/2014 | Brandwine et al. |
| 8,650,618 B2 | 2/2014 | Asati et al. |
| 2001/0043614 A1 | 11/2001 | Viswanadham et al. |
| 2002/0034189 A1 | 3/2002 | Haddock et al. |
| 2002/0093952 A1 | 7/2002 | Gonda |
| 2002/0161867 A1 | 10/2002 | Cochran et al. |
| 2002/0194369 A1 | 12/2002 | Rawlins et al. |
| 2003/0009552 A1 | 1/2003 | Benfield et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2003/0204768 A1 | 10/2003 | Fee |
| 2004/0054680 A1 | 3/2004 | Kelley et al. |
| 2004/0054793 A1 | 3/2004 | Coleman |
| 2004/0073659 A1 | 4/2004 | Rajsic et al. |
| 2004/0098505 A1 | 5/2004 | Clemmensen |
| 2004/0210889 A1 | 10/2004 | Childress et al. |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0021683 A1 | 1/2005 | Newton et al. |
| 2005/0027881 A1 | 2/2005 | Figueira et al. |
| 2005/0050377 A1 | 3/2005 | Chan et al. |
| 2005/0120160 A1 | 6/2005 | Plouffe et al. |
| 2005/0132044 A1 | 6/2005 | Guingo et al. |
| 2005/0201398 A1 | 9/2005 | Naik et al. |
| 2005/0232230 A1 | 10/2005 | Nagami et al. |
| 2006/0026225 A1 | 2/2006 | Canali et al. |
| 2006/0028999 A1 | 2/2006 | Iakobashvili et al. |
| 2006/0037075 A1 | 2/2006 | Frattura et al. |
| 2006/0092976 A1 | 5/2006 | Lakshman et al. |
| 2006/0174087 A1 | 8/2006 | Hashimoto et al. |
| 2006/0178898 A1 | 8/2006 | Habibi |
| 2006/0184653 A1 | 8/2006 | van Riel |
| 2006/0184937 A1 | 8/2006 | Abels et al. |
| 2006/0193266 A1 | 8/2006 | Siddha et al. |
| 2006/0221961 A1 | 10/2006 | Basso et al. |
| 2006/0248179 A1 | 11/2006 | Short et al. |
| 2006/0282895 A1 | 12/2006 | Rentzis et al. |
| 2007/0028239 A1 | 2/2007 | Dyck et al. |
| 2007/0043860 A1 | 2/2007 | Pabari |
| 2007/0050763 A1 * | 3/2007 | Kagan et al. ............. 718/1 |
| 2007/0156919 A1 | 7/2007 | Potti et al. |

(56) References Cited

U.S. PATENT DOCUMENTS

| | | |
|---|---|---|
| 2007/0174429 A1 | 7/2007 | Mazzaferri et al. |
| 2007/0220358 A1 | 9/2007 | Goodill et al. |
| 2007/0234302 A1 | 10/2007 | Suzuki et al. |
| 2007/0239987 A1 | 10/2007 | Hoole et al. |
| 2007/0240160 A1 | 10/2007 | Paterson-Jones et al. |
| 2007/0245082 A1 | 10/2007 | Margolus et al. |
| 2007/0250608 A1 | 10/2007 | Watt |
| 2007/0260721 A1 | 11/2007 | Bose et al. |
| 2007/0266433 A1 | 11/2007 | Moore |
| 2007/0286185 A1 | 12/2007 | Eriksson et al. |
| 2007/0294421 A1* | 12/2007 | Octaviano et al. .............. 709/230 |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0034249 A1 | 2/2008 | Husain et al. |
| 2008/0040467 A1 | 2/2008 | Mendiratta et al. |
| 2008/0049614 A1 | 2/2008 | Briscoe et al. |
| 2008/0049621 A1 | 2/2008 | McGuire et al. |
| 2008/0052206 A1 | 2/2008 | Edwards et al. |
| 2008/0059556 A1 | 3/2008 | Greenspan et al. |
| 2008/0163207 A1 | 7/2008 | Reumann et al. |
| 2008/0189769 A1 | 8/2008 | Casado et al. |
| 2008/0196100 A1 | 8/2008 | Madhavan et al. |
| 2008/0212963 A1 | 9/2008 | Fortin et al. |
| 2008/0225780 A1 | 9/2008 | McCormick et al. |
| 2008/0225853 A1 | 9/2008 | Melman et al. |
| 2008/0240122 A1 | 10/2008 | Richardson et al. |
| 2008/0244569 A1* | 10/2008 | Challener et al. .................. 718/1 |
| 2008/0279196 A1 | 11/2008 | Friskney et al. |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0089625 A1 | 4/2009 | Kannappan et al. |
| 2009/0097495 A1 | 4/2009 | Palacharla et al. |
| 2009/0122710 A1 | 5/2009 | Bar-Tor et al. |
| 2009/0138577 A1 | 5/2009 | Casado et al. |
| 2009/0144220 A1 | 6/2009 | Feng et al. |
| 2009/0150527 A1 | 6/2009 | Tripathi et al. |
| 2009/0161547 A1 | 6/2009 | Riddle et al. |
| 2009/0222924 A1 | 9/2009 | Droz et al. |
| 2009/0249473 A1 | 10/2009 | Cohn |
| 2009/0276661 A1 | 11/2009 | Deguchi et al. |
| 2009/0279536 A1 | 11/2009 | Unbehagen et al. |
| 2009/0292858 A1 | 11/2009 | Lambeth et al. |
| 2009/0303880 A1 | 12/2009 | Maltz et al. |
| 2010/0046531 A1 | 2/2010 | Louati et al. |
| 2010/0061231 A1 | 3/2010 | Harmatos et al. |
| 2010/0082799 A1 | 4/2010 | DeHaan et al. |
| 2010/0115101 A1 | 5/2010 | Lain et al. |
| 2010/0125667 A1 | 5/2010 | Soundararajan |
| 2010/0131636 A1 | 5/2010 | Suri et al. |
| 2010/0138830 A1* | 6/2010 | Astete et al. ...................... 718/1 |
| 2010/0138840 A1* | 6/2010 | Kagan et al. .................. 718/104 |
| 2010/0153554 A1 | 6/2010 | Anschutz et al. |
| 2010/0165877 A1 | 7/2010 | Shukla et al. |
| 2010/0169467 A1 | 7/2010 | Shukla et al. |
| 2010/0191612 A1 | 7/2010 | Raleigh |
| 2010/0191846 A1 | 7/2010 | Raleigh |
| 2010/0192207 A1 | 7/2010 | Raleigh |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0257263 A1* | 10/2010 | Casado et al. ................ 709/223 |
| 2010/0275199 A1 | 10/2010 | Smith et al. |
| 2010/0284402 A1 | 11/2010 | Narayanan |
| 2010/0290485 A1 | 11/2010 | Martini et al. |
| 2011/0004878 A1* | 1/2011 | Divoux ............................. 718/1 |
| 2011/0004913 A1 | 1/2011 | Nagarajan et al. |
| 2011/0010578 A1 | 1/2011 | Agúndez Dominguez et al. |
| 2011/0016215 A1 | 1/2011 | Wang |
| 2011/0026521 A1 | 2/2011 | Gamage et al. |
| 2011/0032830 A1 | 2/2011 | Merwe et al. |
| 2011/0075664 A1 | 3/2011 | Lambeth et al. |
| 2011/0075674 A1* | 3/2011 | Li et al. ......................... 370/401 |
| 2011/0085557 A1 | 4/2011 | Gnanasekaran et al. |
| 2011/0085559 A1 | 4/2011 | Chung et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0194567 A1 | 8/2011 | Shen |
| 2011/0261825 A1 | 10/2011 | Ichino |
| 2011/0310899 A1* | 12/2011 | Alkhatib et al. ............... 370/392 |
| 2011/0318011 A1* | 12/2011 | Brassil ............................ 398/82 |
| 2012/0014386 A1 | 1/2012 | Xiong et al. |
| 2012/0120964 A1 | 5/2012 | Koponen et al. |
| 2012/0147898 A1 | 6/2012 | Koponen et al. |
| 2013/0058208 A1 | 3/2013 | Pfaff et al. |
| 2013/0058215 A1 | 3/2013 | Koponen et al. |
| 2013/0058225 A1 | 3/2013 | Casado et al. |
| 2013/0058226 A1 | 3/2013 | Casado et al. |
| 2013/0058228 A1 | 3/2013 | Koponen et al. |
| 2013/0058229 A1 | 3/2013 | Casado et al. |
| 2013/0058250 A1 | 3/2013 | Casado et al. |
| 2013/0058251 A1 | 3/2013 | Koponen et al. |
| 2013/0058252 A1 | 3/2013 | Casado et al. |
| 2013/0058255 A1 | 3/2013 | Casado et al. |
| 2013/0058331 A1 | 3/2013 | Thakkar et al. |
| 2013/0058334 A1 | 3/2013 | Koponen et al. |
| 2013/0058335 A1 | 3/2013 | Koponen et al. |
| 2013/0058339 A1 | 3/2013 | Casado et al. |
| 2013/0058340 A1 | 3/2013 | Lambeth et al. |
| 2013/0058341 A1 | 3/2013 | Fulton et al. |
| 2013/0058342 A1 | 3/2013 | Casado et al. |
| 2013/0058343 A1 | 3/2013 | Casado et al. |
| 2013/0058344 A1 | 3/2013 | Casado et al. |
| 2013/0058348 A1 | 3/2013 | Koponen et al. |
| 2013/0058350 A1 | 3/2013 | Fulton |
| 2013/0058351 A1 | 3/2013 | Casado et al. |
| 2013/0058353 A1 | 3/2013 | Koponen et al. |
| 2013/0058354 A1 | 3/2013 | Casado et al. |
| 2013/0058356 A1 | 3/2013 | Koponen et al. |
| 2013/0058357 A1 | 3/2013 | Koponen et al. |
| 2013/0058358 A1 | 3/2013 | Fulton et al. |
| 2013/0060736 A1 | 3/2013 | Casado et al. |
| 2013/0060737 A1 | 3/2013 | Koponen et al. |
| 2013/0060738 A1 | 3/2013 | Koponen et al. |
| 2013/0060817 A1 | 3/2013 | Koponen et al. |
| 2013/0060818 A1 | 3/2013 | Lambeth et al. |
| 2013/0060819 A1 | 3/2013 | Lambeth et al. |
| 2013/0060922 A1* | 3/2013 | Koponen et al. ............... 709/223 |
| 2013/0060929 A1 | 3/2013 | Koponen et al. |
| 2013/0060940 A1* | 3/2013 | Koponen et al. ............... 709/225 |

FOREIGN PATENT DOCUMENTS

| | | |
|---|---|---|
| JP | 2002-141905 | 5/2002 |
| JP | 2003-069609 | 3/2003 |
| JP | 2003-124976 | 4/2003 |
| JP | 2003-318949 | 11/2003 |
| WO | WO 95/06989 | 3/1995 |
| WO | WO 2005/112390 | 11/2005 |
| WO | WO 2008/095010 | 8/2008 |
| WO | WO 2009/042919 | 4/2009 |
| WO | WO 2010/115060 | 10/2010 |

OTHER PUBLICATIONS

Definition "hypervisor," http://web.archive.org/web/20100626014115/http://en.wikipedia.org/wiki/Hypervisor, published Jun. 26, 2010.*

Updated portions of prosecution history of U.S. Appl. No. 12/753,044, filed Feb. 19, 2013, Casado, Martin, et al.

Portions of prosecution history of U.S. Appl. No. 13/177,529, Feb. 13, 2013, Koponen, Teemu, et al.

Portions of prosecution history of U.S. Appl. No. 13/177,530, Mar. 1, 2013, Koponen, Teemu, et al.

Portions of prosecution history of U.S. Appl. No. 13/177,531, Feb. 14, 2013, Koponen, Teemu, et al.

Portions of prosecution history of U.S. Appl. No. 13/177,532, Mar. 15, 2013, Casado, Martin, et al.

Portions of prosecution history of U.S. Appl. No. 13/177,533, Mar. 5, 2013, Koponen, Teemu, et al.

(56) References Cited

OTHER PUBLICATIONS

Portions of prosecution history of U.S. Appl. No. 13/177,534, Apr. 9, 2013, Casado, Martin, et al.
Portions of prosecution history of U.S. Appl. No. 13/177,535, Jan. 17, 2013, Casado, Martin, et al.
Portions of prosecution history of U.S. Appl. No. 13/177,537, Dec. 19, 2012, Koponen, Teemu, et al.
Portions of prosecution history of U.S. Appl. No. 13/177,538, Nov. 28, 2012, Koponen, Teemu, et al.
Portions of prosecution history of U.S. Appl. No. 13/177,539, Mar. 6, 2013, Casado, Martin, et al.
Portions of prosecution history of U.S. Appl. No. 13/177,540, Mar. 15, 2013, Lambeth, W. Andrew, et al.
Portions of prosecution history of U.S. Appl. No. 13/177,543, Apr. 22, 2013, Koponen, Teemu, et al.
Portions of prosecution history of U.S. Appl. No. 13/177,545, Feb. 8, 2013, Fulton, Bryan J. et al.
Portions of prosecution history of U.S. Appl. No. 13/177,546, Sep. 26, 2011, Fulton, Bryan J., et al.
Portions of prosecution history of U.S. Appl. No. 13/218,433, Apr. 22, 2013, Koponen, Teemu, et al.
Portions of prosecution history of commonly owned U.S. Appl. No. 12/286,098, listed as item #63 above, including action(s) dated Nov. 7, 2012, Feb. 21, 2012, Nov. 8, 2011, Jun. 22, 2011, Mar. 24, 2011, Aug. 18, 2010, and May 5, 2010; and response(s)/amendment(s) filed Jun. 21, 2012, Oct. 24, 2011, Apr. 14, 2011, Mar. 14, 2011, Feb. 18, 2011, Jun. 4, 2010, and Sep. 24, 2009 (177 pages).
Portions of prosecution history of commonly owned U.S. Appl. No. 12/753,044, listed as item #72 above, including action(s) dated Sep. 24, 2012, Jan. 24, 2012, and Nov. 8, 2011; and response(s)/amendment(s) filed Jul. 24, 2012, Dec. 8, 2011, and Mar. 31, 2011 (108 pages).
Adya, Atul, et al., "Cooperative Task Management without Manual Stack Management," Jun. 2002, 14 pages, Proceedings of the Usenix Annual Technical Conference, Monterey, CA, USA.
Andersen, David, et al., "Resilient Overlay Networks," Oct. 2001, 15 pages, 18th ACM Symp. On Operating Systems Principles (SOSP), Banff, Canada, ACM.
Anderson, Thomas, et al., "Overcoming the Internet Impasse through Virtualization," Apr. 2005, pp. 34-41, IEEE Computer Society.
Anhalt, Fabienne, et al., "Analysis and evaluation of a XEN based virtual router," Sep. 2008, pp. 1-60, Unite de recherché INRA Phone-Alpes, Montbonnot Saint-Ismier, France.
Anwer, Muhammad Bilal, et al., "Building a Fast, Virtualized Data Plane with Programmable Hardware," Aug. 17, 2009, pp. 1-8, VISA'09, Barcelona, Spain, ACM.
Author Unknown , "Cisco Nexis 1000V Series Switches," Date Unknown but prior to Jul. 29, 2010, 2 pages, Cisco Systems, Inc., http://web.archive.org/web/20100729045626/http://www.cisco.com/en/US/Products/ps9902/index.html.
Author Unknown , "Cisco VN-Link: Virtualization-Aware Networking," Month Unknown, 2009, 10 pages, Cisco Systems, Inc.
Author Unknown , "Citrix Launches New XenServer Release as Market Share Growth Continues," Oct. 6, 2010, 3 pages, Citrix Systems, Inc. (http://www.citrix.com/English/ne/news/news.asp?newsID=2304355).
Author Unknown, "HP OpenView Enterprise Management Starter Solution," Jun. 2006, p. 1-4, Hewlett-Packard Development Company, HP.
Author Unknown, "HP OpenView Operations 8.0 for UNIX Developer's Toolkit," Month Unlknown, 2004, pp. 1-4, Hewlett-Packard Development Company, HP.
Author Unknown , "HP Web Jetadmin Integration into HP OpenView Network Node Manager," Feb., 2004, pp. 1-12, HP.
Author Unknown , "IEEE Standard for Local and metropolitan area networks—Virtual Bridged Local Area Networks, Amendment 5: Connectivity Fault Management," IEEE Std 802.1ag, Dec. 17, 2007, 260 pages, IEEE, New York, NY, USA.
Author Unknown, "Intel 82599 10 Gigabit Ethernet Controller: Datasheet, Revision: 2.73," Dec. 2011, 930 pages, Intel Corporation.
Author Unknown , "Introduction to VMware Infrastructure: ESX Server 3.5, ESX Server 3i version 3.5, VirtualCenter 2.5," Revision Dec. 13, 2007, pp. 1-46, VMware, Inc., Palo Alto, California, USA.
Author Unknown , "iSCSI SAN Configuration Guide: ESX Server 3.5, ESX Server 3i version 3.5, VirtualCenter 2.5," Revision Nov. 29, 2007, pp. 1-132, VMware, Inc., Palo Alto, CA, USA.
Author Unknown , "Open vSwitch, An Open Virtual Switch," Date Unknown but prior to Dec. 30, 2010, 2 pages, http://www.openvswitch.org/, Open vSwitch.
Author Unknown, "OpenFlow Switch Specification, Version 0.9.0 (Wire Protocol 0x98)," Jul. 20, 2009, pp. 1-36, Open Networking Foundation.
Author Unknown, OpenFlow Switch Specification, Version 1.0.0 (Wire Protocol 0x01), Dec. 31, 2009, pp. 1-42, Open Networking Foundation.
Author Unknown, "Private Network-Network Interface Specification Version 1.1 (PNNI 1.1)," The ATM Forum Technical Committee, Apr. 2002, 536 pages, The ATM Forum.
Author Unknown , "Single Root I/O Virtualization and Sharing Specification, Revision 1.0," Sep. 11, 2007, pp. 1-84, PCI-SIG.
Author Unknown, "Virtual Machine Device Queues," White Paper, Month Unknown, 2007, pp. 1-4, Intel Corporation.
Author Unknown , "VMare for Linus Networking Support," Date Unknown but prior to Nov. 17, 1999, pp. 1-5, VMWare, Inc.
Ballani, Hitesh, et al., "Making Routers Last Longer with ViAggre," NSDI'09: 6th USENIX Symposium on Networked Systems Design and Implementation, Apr. 2009, pp. 453-466, USENIX Association.
Barham, Paul, et al., "Xen and the Art of Virtualization," Oct. 19-22, 2003, pp. 1-14, SOSP'03, Bolton Landing New York, USA.
Bavier, Andy, et. al., "In VINI Veritas: Realistic and Controlled Network Experimentation," SIGCOMM'06, Sep. 2006, pp. 1-14, Pisa, Italy.
Bhatia, Sapan, et al., "Trellis: A Platform for Building Flexible, Fast Virtual Networks on Commodity Hardware," ROADS'08, Dec. 9, 2008, pp. 1-6, Madrid, Spain, ACM.
Caesar, Matthew, et al., "Design and Implementation of a Routing Control Platform," NSDI '05: 2nd Symposium on Networked Systems Design & Implementation , Apr. 2005, pp. 15-28, Usenix Association.
Cai, Zheng, et al., "The Preliminary Design and Implementation of the Maestro Network Control Platform," Oct. 1, 2008, pp. 1-17, NSF.
Casado, Martin, et al. "Ethane: Taking Control of the Enterprise," SIGCOMM'07, Aug. 27-31, 2007, pp. 1-12, ACM, Kyoto, Japan.
Casado, Martin, et al., "Rethinking Packet Forwarding Hardware," Seventh ACM SIGCOMM' HotNets Workshop, Nov. 2008, pp. 1-6, ACM.
Casado, Martin, et al., "SANE: A Protection Architecture for Enterprise Networks," In proceedings of Usenix Security, Aug. 2006, pp. 1-15.
Casado, Martin, et al., "Virtualizing the Network Forwarding Plane," Dec. 2010, pp. 1-6.
Congdon, Paul, "Virtual Ethernet Port Aggregator Standards body Discussion," Nov. 10, 2008, pp. 1-26, HP.
Cooper, Brian F., et al., "PNUTS: Yahoo!'s Hosted Data Serving Platform," VLDB'08, Aug. 24-30, 2008, pp. 1-12, ACM , Auckland, New Zealand.
Davoli, Renzo, "VDE: Virtual Distributed Ethernet," TRIDENTCOM'05, Feb. 23-25, 2005, pp. 1-8, IEEE Computer Society.
Dixon, Colin, et al., "An End to the Middle," Proceedings of the 12th conference on Hot topics in operating systems USENIX Association, May 2009, pp. 1-5, Berkeley, CA, USA.
Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, pp. 1-17, ACM New York, NY.
Enns, R., "NETCONF Configuration Protocol," Dec. 2006, pp. 1-96, IETF Trust (RFC 4741).
Farinacci, D., et al., "Generic Routing Encapsulation (GRE)," Mar. 2000, pp. 1-9, The Internet Society (RFC 2784).
Farrel, A., "A Path Computation Element (PCS)—Based Architecture," Aug. 2006, pp. 1-41, RFC 4655.

(56) References Cited

OTHER PUBLICATIONS

Fischer, Anna, "[PATCH][RFC] net/bridge: add basic VEPA support," Jun. 2009, pp. 1-5, GMANE Org.
Garfinkel, Tal, et al., "A Virtual Machine Introspection Based Architecture for Intrusion Detection," In Proc. Network and Distributed Systems Security Symposium, Feb. 2003, pp. 1-16.
Godfrey, P. Brighten, et al., "Pathlet Routing," SIGCOMM, Aug. 2009, pp. 1-6, ACM.
Greenberg, Albert, et al., "A Clean Slate 4D Approach to Network Control and Management," ACM SIGCOMM Computer Communication Review, Oct. 2005, 12 pages, vol. 35, No. 5.
Greenberg, Albert, et al., "VL2: A Scalable and Flexible Data Center Network," SIGCOMM'09, Aug. 17-21, 2009, pp. 51-62, ACM, Barcelona, Spain.
Greenhalgh, Adam, et al., "Flow Processing and the Rise of Commodity Network Hardware," ACM SIGCOMM Computer Communication Review, Apr. 2009, pp. 21-26, vol. 39, No. 2.
Gude, Natasha, et al., "NOX: Towards an Operating System for Networks," ACM SIGCOMM Computer communication Review, Jul. 2008, pp. 105-110, vol. 38, No. 3.
Guo, Chanxiong, et al., "BCube: A High Performance, Server-centric Network Architecture for Modular Data Centers," SIGCOMM'09, Aug. 17-21, 2009, pp. 1-12, ACM, Barcelona, Spain.
Hamilton, James, et al., "Datacenter Networks Are in My Way," Principals of Amazon Series, Oct. 28, 2010, pp. 1-14.
Handley, Mark, et al., "Designing Extensible IP Router Software," Proc. Of NSDI, May 2005, pp. 1-14.
Hinrichs, Timothy L., et al., "Practical Declarative Network Management," WREN'09, Aug. 21, 2009, pp. 1-10, Barcelona, Spain.
Hunt, Patrick, et al., "ZooKeeper: Wait-free Coordination for Internet-Scale Systems," Proc. Of Usenix Annual Technical Conference, Month Unknown, 2010, pp. 1-14.
Ioannidis, Sotiris, et al., "Implementing a Distributed Firewall," CCS'00, Month Unknown, 2000, pp. 1-10, ACM, Athens, Greece.
John, John P., et al., "Consensus Routing: The Internet as a Distributed System," Proc. Of NSDI , Apr. 2008, pp. 1-14.
Kamath, Daya, et. al., "Edge virtual Bridge Proposal, Version 0. Rev. 0.1," Apr. 23, 2010, pp. 1-72, IEEE.
Katz, D., et. al, "Bidirectional Forwarding Detection, draft-ietf-bfd-base-11.txt," Month Unknown, 2009, pp. 1-51, IETF Trust.
Keller, Eric, et al., "The 'Platform as a Service' Model for Networking," Month Unknown, 2010, pp. 1-6.
Kim, Changhoon, et al., "Floodless in Seattle: A Scalable Ethernet Architecture for Large Enterprises," SIGCOMM'08, Aug. 17-22, 2008, pp. 3-14, ACM, Seattle, Washington, USA.
Kohler, Eddie, et al., "The Click Modular Router," ACM Trans. On Computer Systems, Aug. 2000, 34 pages, vol. 18, No. 3.
Koponen, Teemu, et al., "Onix: A Distributed Control Platform for Large-scale Production Networks," in Proc. OSDI, Oct. 2010, pp. 1-14.
Labovitz, Craig, et al., "Delayed Internet Routing Convergence," SIGCOMM '00, Month Unknown, 2000, pp. 175-187, Stockholm, Sweden.
Labovitz, Craig, et al., "Internet Routing Instability," ACM SIGCOMM '97, Month Unknown, 1997, pp. 1-12, Association for Computing Machinery, Inc.
Lakshminarayanan, Karthik, et al., "Routing as a Service," Month Unknown, 2004, pp. 1-15, Berkeley, California.
Luo, Jianying, et al., "Prototyping Fast, Simple, Secure Switches for Ethane," Month Unknown, 2007, pp. 1-6.
Maltz, David A., et al., "Routing Design in Operational Networks: A Look from the Inside," SIGCOMM'04, Aug. 30-Sep. 3, 2004, pp. 1-14, ACM, Potland, Oregon, USA.
McKeown, Nick, et al., "OpenFlow: Enabling Innovation in Campus Networks," ACS SIGCOMM Computer communication Review, Apr. 2008, pp. 69-74, vol. 38, No. 2.
Mogul, Jeffrey C., et al., "API Design Challenges for Open Router Platforms on Proprietary Hardware," Oct. 2008, pp. 1-6.
Mysore, Radhka Niranjan, et al., "PortLand: A Scalable Fault-Tolerant Layer 2 Data Center Network Fabric," Proc. Of SIGCOMM, Aug. 17-21, 2009, pp. 1-12.
Partridge, Craig, et al., "A 50-Gb/s IP Router," IEEE/ACM Transactions on Networking Jun. 1998, pp. 237-248.
Pelissier, Joe, "Network Interface Virtualization Review," Jan. 2009, pp. 1-38.
Pelissier, Joe, "VNTag 101," May 2008, pp. 1-87.
Peterson, Larry L., et al., "OS Support for General-Purpose Routers," Month Unknown, 1999, 6 pages.
Pettit, Justin, et al., "Virtual Switching in an Era of Advanced Edges," Sep. 2010, 7 pages.
Pfaff, Ben., et al., "Extending Networking into the Virtualization Layer," Proc. Of HotNets, Oct. 2009, pp. 1-6.
Phan, Doantam, et al., "Visual Analysis of Network Flow Data with Timelines and Event Plots," Month Unknown, 2007, pp. 1-16, VizSEC.
Rosen, E., et al., "Applicant Statement for BGP/MPLS IP Virtual Private Networks (VPNs)," The Internet Society, RFC 4365, Feb. 2006, pp. 1-32.
Sherwood, Rob, et al., "Can the Production Network Be the Testbed?," Month Unknown, 2010, pp. 1-14.
Sherwood, Rob, et al., "Carving Research Slices Out of Your Production Networks with OpenFlow," ACM SIGCOMM Computer Communications Review, Jan. 2010, pp. 129-130, vol. 40, No. 1.
Sherwood, Rob, et al., "FlowVisor: A Network Virtualization Layer," Oct. 14, 2009, pp. 1-14, OPENFLOW-TR-2009-1.
Spalink, Tammo, et al., "Building a Robust Software-Based Router Using Network Processors," Month Unknown, 2001, pp. 216-229, ACM, Banff, CA.
Tavakoli, Arsalan, et al., "Applying NOX to the Datacenter," Proc. HotNets, Month Unknown, 2009, 6 pages.
Touch, J., et al., "Transparent Interconnection of Lots of Links (TRILL): Problem and Applicability Statement," May 2009, pp. 1-17, IETF Trust, RFC 5556.
Turner, Jon, et al., "Supercharging PlanetLab—High Performance, Multi-Application Overlay Network Platform," SIGCOMM-07, Aug. 27-31, 2007, 12 pages, ACM, Koyoto, Japan.
Turner, Jonathan S., "A Proposed Architecture for the GENI Backbone Platform," ANCS'06, Dec. 3-5, 2006, 10 pages, ACM, San Jose, California, USA.
Wang, Yi, et al., "Virtual Routers on the Move: Live Router Migration as a Network-management Primitive," SIGCOMM 08, Aug. 17-22, 2008, 12 pages, ACM, Seattle, Washington, USA.
Xie, Geoffrey G., et al., "On Static Reachability Analysis of IP Networks," Month Unknown, 2005, pp. 1-14.
Yang, L., et al., "Forwarding and Control Element Separation (ForCES) Framework," Apr. 2004, pp. 1-40, The Internet Society.
Yu, Minlan, et al., "Scalable Flow-Based Networking with DIFANE," In Proc. SIGCOMM Aug. 2010, 16 pages.
Updated portions of prosecution history of U.S. Appl. No. 12/286,098, May 7, 2013, Casado, Martin, et al.
Updated portions of prosecution history of U.S. Appl. No. 13/177,529, May 31, 2013, Koponen, Teemu, et al.
Updated portions of prosecution history of U.S. Appl. No. 13/177,530, May 31, 2013, Koponen, Teemu, et al.
Updated portions of prosecution history of U.S. Appl. No. 13/177,531, May 2, 2013, Koponen, Teemu, et al.
Updated portions of prosecution history of U.S. Appl. No. 13/177,533, May 31, 2013, Koponen, Teemu, et al.
Updated portions of prosecution history of U.S. Appl. No. 13/177,537, May 20, 2013, Koponen, Teemu, et al.
Updated portions of prosecution history of U.S. Appl. No. 13/177,538, May 28, 2013, Koponen, Teemu, et al.
Updated portions of prosecution history of U.S. Appl. No. 13/177,539, May 31, 2013, Casado, Martin, et al.
Updated portions of prosecution history of U.S. Appl. No. 13/177,545, filed May 31, 2013, Fulton, Bryan J., et al.
Author Unknown, "Packet Processing on Intel® Architecture," Month Unknown, 2013, 6 pages, available at http://www.intel.com/content/www/us/en/intelligent-systems/intel-technology/packet-processing-is-enhanced-with-software-from-intel-dpdk.html.

(56) References Cited

OTHER PUBLICATIONS

Loo, Boon Thau, et al., "Declarative Routing: Extensible Routing with Declarative Queries," In Proc. of SIGCOMM, Aug. 21-26, 2005, 14 pages, Philadelphia, PA, USA.
Loo, Boon Thau, et al., "Implementing Declarative Overlays," In Proc. of SOSP, Oct. 2005, 16 pages. Brighton, UK.
Shenker, Scott, et al., "The Future of Networking, and the Past of Protocols," Dec. 2, 2011, 30 pages, USA.
Updated portions of prosecution history of U.S. Appl. No. 12/286,098, Jan. 29, 2014, Casado, Martin, et al.
Updated portions of prosecution history of U.S. Appl. No. 13/177,529, Apr. 15, 2014, Koponen, Teemu, et al.
Updated portions of prosecution history of U.S. Appl. No. 13/177,537, Jan. 10, 2014, Koponen, Teemu, et al.
Updated portions of prosecution history of U.S. Appl. No. 13/177,543, Apr. 2, 2014, Koponen, Teemu, et al.
Updated portions of prosecution history of U.S. Appl. No. 13/218,433, Jan. 27, 2014, Koponen, Teemu, et al.
Updated portions of prosecution history of U.S. Appl. No. 13/177,532, Apr. 15, 2014, Casado, Martin, et al.
Updated portions of prosecution history of U.S. Appl. No. 13/177,534, Apr. 16, 2014, Casado, Martin, et al.
Updated portions of prosecution history of U.S. Appl. No. 13/177,540, Mar. 4, 2014, Lambeth, W. Andrew, et al.
Updated portions of prosecution history of U.S. Appl. No. 13/177,545, Apr. 15, 2014, Fulton, Bryan J., et al.
Updated portions of prosecution history of U.S. Appl. No. 13/177,533, Apr. 3, 2014, Koponen, Teemu, et al.
Updated portions of prosecution history of U.S. Appl. No. 13/177,531, Mar. 27, 2014, Koponen, Teemu, et al.
Updated portions of prosecution history of U.S. Appl. No. 13/177,530, Apr. 4, 2014, Koponen, Teemu, et al.
Updated portions of prosecution history of U.S. Appl. No. 13/177,539, Apr. 9, 2014, Casado, Martin, et al.
Updated portions of prosecution history of U.S. Appl. No. 13/177,535, Feb. 24, 2014, Casado, Martin, et al.
Updated portions of prosecution history of U.S. Appl. No. 13/177,538, filed Apr. 14, 2014, Koponen, Teemu, et al.
Das, Suarav, et al., "Unifying Packet and Circuit Switched Networks with OpenFlow," Dec. 7, 2009, 10 pages.
Das, Suarav, et al. "Simple Unified Control for Packet and Circuit Networks," Month Unknown, 2009, pp. 147-148, IEEE.
Updated portions of prosecution history of U.S. Appl. No. 13/177,543, Apr. 22, 2014, Koponen, Teemu, et al.
Updated portions of prosecution history of U.S. Appl. No. 13/218,433, Apr. 28, 2014, Koponen, Teemu, et al.
Updated portions of prosecution history of U.S. Appl. No. 13/177,540, Apr. 22, 2014, Lambeth, W. Andrew, et al.
Updated portions of prosecution history of U.S. Appl. No. 13/177,545, Apr. 30, 2014, Fulton, Bryan J., et al.
Updated portions of prosecution history of U.S. Appl. No. 13/177,535, Apr. 21, 2014, Casado, Martin, et al.
Portions of prosecution history of U.S. Appl. No. 13/218,471, Mar. 18, 2014, Casado, Martin, et al.
Portions of prosecution history of U.S. Appl. No. 13/219,533, Feb. 28, 2014, Casado, Martin, et al.
Portions of prosecution history of U.S. Appl. No. 13/218,468, Mar. 10, 2014, Pfaff, Benjamin L., et al.
Portions of prosecution history of U.S. Appl. No. 13/218,464, Apr. 4, 2014, Casado, Martin, et al.
Portions of prosecution history of U.S. Appl. No. 13/543,784, Apr. 17, 2014, Koponen, Teemu, et al.
Portions of prosecution history of U.S. Appl. No. 13/269,409, Apr. 22, 2014, Koponen, Teemu, et al.

\* cited by examiner

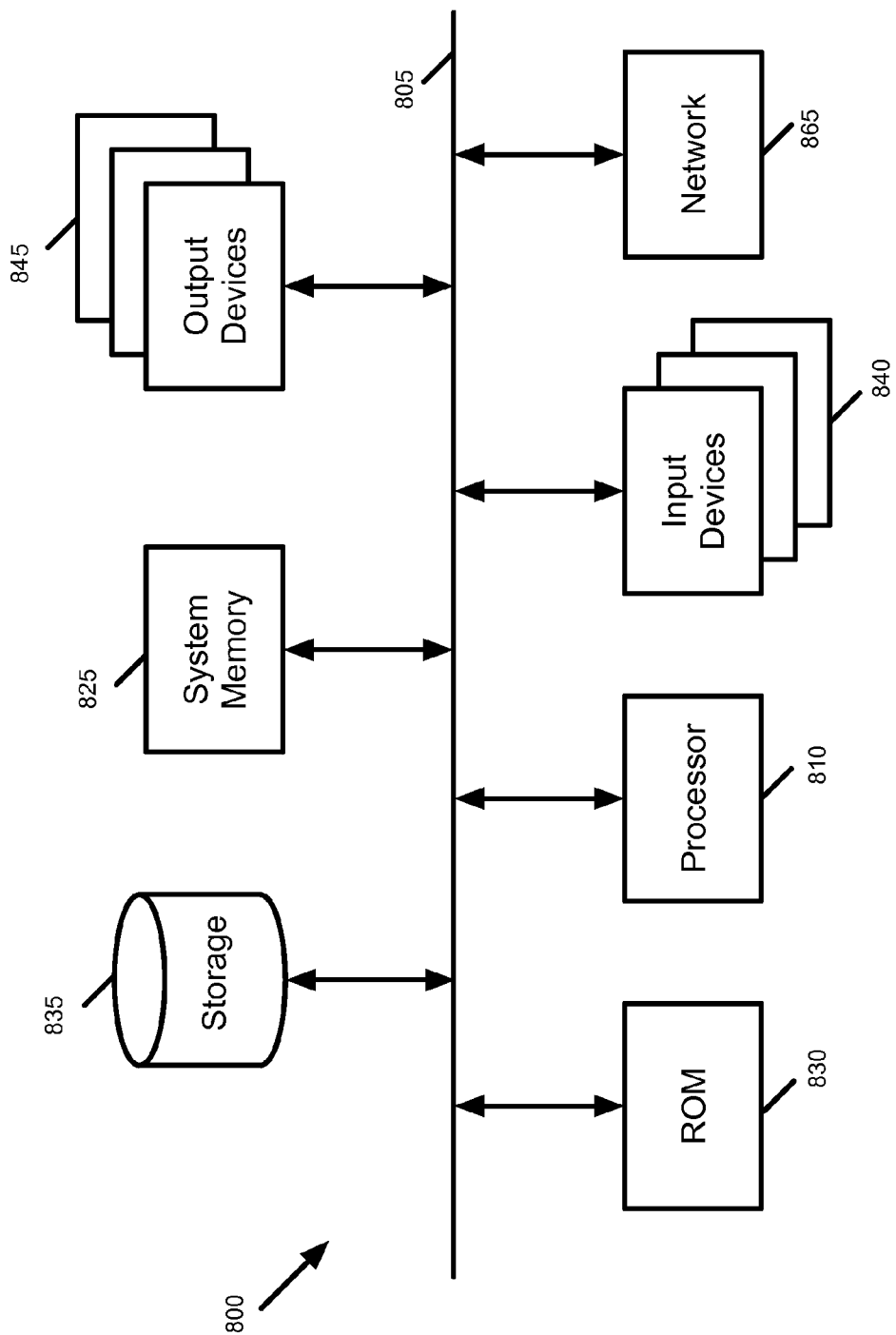

NETWORK VIRTUALIZATION

CLAIM OF BENEFIT TO PRIOR APPLICATION

This application claims benefit to U.S. Provisional Patent Application 61/361,912, filed on Jul. 6, 2010; U.S. Provisional Patent Application 61/361,913, filed on Jul. 6, 2010; U.S. Provisional Patent Application 61/429,753, filed on Jan. 4, 2011; U.S. Provisional Patent Application 61/429,754, filed on Jan. 4, 2011; U.S. Provisional Patent Application 61/466,453, filed on Mar. 22, 2011; U.S. Provisional Patent Application 61/482,205, filed on May 3, 2011; U.S. Provisional Patent Application 61/482,615, filed on May 4, 2011; U.S. Provisional Patent Application 61/482,616, filed on May 4, 2011; U.S. Provisional Patent Application 61/501,743, filed on Jun. 27, 2011; and U.S. Provisional Patent Application 61/501,785, filed on Jun. 28, 2011. These provisional applications are incorporated herein by reference.

BACKGROUND

The mantra of modern datacenters is scale out, not up. To handle ever-increasing aggregate capacities, these datacenters do not use larger-capacity components—which suffer from higher per-unit-of-capacity prices—but instead harness the aggregate capacity of large numbers of commodity components. The scale-out approach has allowed these datacenters to reach previously unthinkable levels of scale (e.g., hundreds of thousands of servers), thereby opening up exciting new computational vistas. Moreover, because the scale-out approach treats hardware as a resource pool from which individual components can be allocated to workloads on demand without manual intervention, failures can be tolerated gracefully and the operational costs per-unit-of-capacity are vanishingly small compared to those in a traditional enterprise.

Datacenter scale-out is facilitated by the use of global file systems (e.g., GFS) and programming frameworks (e.g., MapReduce) that provide a set of abstractions that shield programmers from the datacenter's underlying storage and computational hardware. More specifically, applications use servers as generic computation elements that are fed tasks by a job dispatcher or load-balancer; adding additional servers merely provides more aggregate capacity without changing the programmatic abstractions. Similarly, storage services allow multiple physical disks to be abstracted through a single block or filesystem interface, and the available storage capacity can be increased by adding more disks without disrupting existing data access or configuration. Often the data is replicated on the backend so disk failures can be handled without data loss, but this failure resilience is hidden completely behind the simple storage abstraction.

While computation and storage are scale-out success stories, networks pose a more subtle challenge to the scale-out paradigm. In terms of simple packet delivery, there have been several recent proposals that allow network forwarding to be scaled-out. The physical network is treated as a single switching fabric; load balancing is used to distribute traffic throughout the fabric, allowing newly added switches to be used effectively. This unified fabric supports a very simple forwarding abstraction to end hosts: delivery to a stable Internet Protocol (IP) address (regardless of where that host or virtual machine (VM) currently resides in the physical network). This abstraction shields applications from the underlying networking hardware, allowing for a clean scaling-out of basic packet delivery.

However, scaling out the network forwarding fabric in this fashion is not sufficient. Rather than just providing simple packet delivery, current routers and switches support a rich set of local functions such as access control lists (ACLs), isolation (via virtual local area networks (VLANs) and virtual routing and forwarding (VRF)), monitoring (e.g., remote switched port analyzer (RSPAN) and NetFlow), and bandwidth allocation (via quality of service (QoS) configuration). The overall forwarding behavior of the network depends on all these additional local functions, but they are not captured by the existing approaches that scale-out basic packet delivery.

A robust version of network scale-out is difficult because—unlike computation, storage, and simple packet delivery—there is no well-accepted abstraction for this more general form of global network behavior; instead, global network behavior is typically defined only in terms of the set of individual router/switch configurations. As a result, in networks that implement any non-trivial forwarding functionality, adding a new switch requires explicit reconfiguration of the network (not just the newly added switch) to ensure that the new network provides the same overall behavior as before. This inability to add new networking hardware without manual configuration is a barrier to the fully faithful scaling-out of network functionality. Consequently, there is a need in the art to provide a more robust scaling-out of network functionality.

Virtualization is by no means a new concept within networking. It is heavily used in practice today. For example, virtualization concepts are used to partition forwarding devices into logical subsets, and to create logical components such as L2 forwarding domains (VLANs), or logical links (e.g. multiprotocol label switching (MPLS) or generic routing encapsulation (GRE)). Further, it has been used for decades to create experimental testbeds as overlays, or partitioned physical networks.

Recently, some have suggested the use of a software layer between the control and forwarding planes of a router to facilitate migration (e.g. virtual routers on the move (VROOM) described in the proceedings of the August 2009 SIGCOMM Symposium entitled "Virtual Routers on the Move: Live Router Migration as a Network-management Primitive"). However, this approach limits to running single logical forwarding element per physical switch. Consequently, there is a need in the art to extend the logical view across multiple physical elements and support multiple logical contexts sharing the same underlying hardware. Further, there is a need in the art to focus on providing general scaling-out of control logic, not on supporting just control logic migration.

Some have also suggested building networks on top of other networks for a variety of purposes (e.g. Overlays). However, this approach is often used to introduce new functionality when the operator cannot or does not want to change (for administrative or implementation reasons) the features in the underlying hardware. For example, an overlay allows the operators to provide the overlay functionality at a small set of network nodes, and use the underlying network to provide connectivity between these overlay nodes. However, the control of the overlay itself is done with traditional mechanisms, operating on a set of physical nodes in the overlay. Consequently, there is a need in the art to use a fully logical network abstraction to express the desired functionality, and then use a software layer to map this logical abstraction to the underlying hardware. In the process of mapping the logical to the physical, the software layer can effectively create an overlay network.

BRIEF SUMMARY

Some embodiments of the invention provide a system that allows several different logical data path sets to be specified for several different users through one or more shared network infrastructure switching elements (referred to as "switching elements" below). In some embodiments, the system includes a set of software tools that allows the system to accept logical data path sets from users and to configure the switching elements to implement these logical data path sets. These software tools allow the system to virtualize control of the shared switching elements and the network that is defined by the connections between these shared switching elements, in a manner that prevents the different users from viewing or controlling each other's logical data path sets (i.e., each other's switching logic) while sharing the same switching elements.

In some embodiments, one of the software tools that allows the system to virtualize control of a set of switching elements (i.e., to allow several users to share the same switching elements without viewing or controlling each other's logical data path sets) is an intermediate data storage structure that (1) stores the state of the network, (2) receives and records modifications to different parts of the network from different users, and (3), in some embodiments, provides different views of the state of the network to different users. For instance, in some embodiments, the intermediate data storage structure is a network information base (NIB) data structure that stores the state of the network that is defined by one or more switching elements. The system uses this NIB data structure as an intermediate storage structure for reading the state of the network and writing modifications to the state of the network. In some embodiments, the NIB also stores the logical configuration and the logical state for each user specified logical data path set. In these embodiments, the information in the NIB that represents the state of the actual switching elements accounts for only a subset of the total information stored in the NIB.

In some embodiments, the system has (1) a network operating system (NOS) to create and maintain the NIB storage structure, and (2) one or more applications that run on top of the NOS to specify logic for reading values from and writing values to the NIB. When the NIB is modified in order to effectuate a change in the switching logic of a switching element, the NOS of some embodiments also propagates the modification to the switching element.

The system of different embodiments uses the NIB differently to virtualize access to the shared switching elements and network. In some embodiments, the system provides different views of the NIB to different users in order to ensure that different users do not have direct view and control over each other's switching logic. For instance, in some embodiments, the NIB is a hierarchical data structure that represents different attributes of different switching elements as elements (e.g., different nodes) in a hierarchy. The NIB in some of these embodiments is a multi-layer hierarchical data structure, with each layer having a hierarchical structure and one or more elements (e.g., nodes) on each layer linked to one or more elements (e.g., nodes) on another layer. In some embodiments, the lowest layer elements correspond to the actual switching elements and their attributes, while each of the higher layer elements serve as abstractions of the actual switching elements and their attributes. As further described below, some of these higher layer elements are used in some embodiments to show different abstract switching elements and/or switching element attributes to different users in a virtualized control system.

In some embodiments, the definition of different NIB elements at different hierarchical levels in the NIB and the definition of the links between these elements are used by the developers of the applications that run on top of the NOS in order to define the operations of these applications. For instance, in some embodiments, the developer of an application running on top of the NOS uses these definitions to enumerate how the application is to map the logical data path sets of the user to the physical switching elements of the control system. Under this approach, the developer would have to enumerate all different scenarios that the control system may encounter and the mapping operation of the application for each scenario. This type of network virtualization (in which different views of the NIB are provided to different users) is referred to below as Type I network virtualization.

Another type of network virtualization, which is referred to below as Type II network virtualization, does not require the application developers to have intimate knowledge of the NIB elements and the links (if any) in the NIB between these elements. Instead, this type of virtualization allows the application to simply provide user specified, logical switching element attributes in the form of one or more tables, which are then mapped to NIB records by a table mapping engine. In other words, the Type II virtualized system of some embodiments accepts the logical switching element configurations (e.g., access control list table configurations, L2 table configurations, L3 table configurations, etc.) that the user defines without referencing any operational state of the switching elements in a particular network configuration. It then maps the logical switching element configurations to the switching element configurations stored in the NIB.

To perform this mapping, the system of some embodiments uses a database table mapping engine to map input tables, which are created from (1) logical switching configuration attributes, and (2) a set of properties associated with switching elements used by the system, to output tables. The content of these output tables are then transferred to the NIB elements. In some embodiments, the system uses a variation of the datalog database language, called nLog, to create the table mapping engine that maps input tables containing logical data path data and switching element attributes to the output tables. Like datalog, nLog provides a few declaratory rules and operators that allow a developer to specify different operations that are to be performed upon the occurrence of different events. In some embodiments, nLog provides a limited subset of the operators that are provided by datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to address an event into several sets of database join operations. Collectively the larger set of rules forms the table mapping, rules engine that is referred to below as the nLog engine. In some embodiments, the nLog virtualization engine also provides feedback (e.g., from one or more of the output tables or from NIB records that are updated to reflect values stored in the output tables) to the user in order to provide the user with state information about the logical data path set that he or she created. In this manner, the updates that the user gets are expressed in terms of the logical space that the user understands and not in terms of the underlying switching element states, which the user does not understand.

The use of nLog serves as a significant distinction between Type I virtualized control systems and Type II virtualized control systems, even for Type II systems that store user specified logical data path sets in the NIB. This is because nLog provides a machine-generated rules engine that addresses the mapping between the logical and physical domains in a more robust, comprehensive manner than the hand-coded approach used for Type I virtualized control systems. In the Type I control systems, the application developers need to have a detailed understanding of the NIB structure and need to use this detailed understanding to write code that addresses all possible conditions that the control system would encounter at runtime. On the other hand, in Type II control systems, the application developers only need to produce applications that express the user-specified logical data path sets in terms of one or more tables, which are then mapped in an automated manner to output tables and later transferred from the output tables to the NIB. This approach allows the Type II virtualized systems not to maintain the data regarding the logical data path sets in the NIB. However, some embodiments maintain this data in the NIB in order to distribute this data among other NOS instances. The use of nLog engine and Type I and II virtualized systems are described in U.S. patent application Ser. No. 13/177,533, now issued as U.S. Pat. No. 8,817,620, entitled "Network Virtualization Apparatus and Method", filed concurrently with this application, and incorporated by reference in this application.

As apparent from the above discussion, the applications that run on top of a NOS instance can perform several different sets of operations in several different embodiments of the invention. Examples of such operations include providing an interface to a user to access NIB data regarding the user's switching configuration, providing different layered NIB views to different users, providing control logic for modifying the provided NIB data, providing logic for propagating received modifications to the NIB, etc.

In some embodiments, the system embeds some or all such operations in the NOS instead of including them in an application operating on top of the NOS. Alternatively, in other embodiments, the system separates some or all of these operations into different subsets of operations and then has two or more applications that operate above the NOS perform the different subsets of operations. One such system runs two applications on top of the NOS, a control application and a virtualization application (referred to as a network hypervisor for some embodiments). In some embodiments, the control application allows a user to specify and populate logical data path sets, while the virtualization application implements the specified logical data path sets by mapping the logical data path set to the physical switching infrastructure. In some embodiments, the virtualization application translates control application input into records that are written into the NIB, and from the NIB these records are then subsequently transferred to the switching infrastructure through the operation of the NOS. In some embodiments, the NIB stores both the logical data path set input received through the control application and the NIB records that are produced by the virtualization application.

In some embodiments, the control application can receive switching infrastructure data from the NIB. In response to this data, the control application may modify record(s) associated with one or more logical data path sets (LDPS). Any such modified LDPS record would then be translated to one or more physical switching infrastructure records by the virtualization application, which might then be transferred to the physical switching infrastructure by the NOS.

In some embodiments, the NIB stores data regarding each switching element within the network infrastructure of a system, while in other embodiments, the NIB stores state information about only switching elements at the edge of a network infrastructure. In some embodiments, edge switching elements are switching elements that have direct connections with the computing devices of the users, while non-edge switching elements only connect to edge switching elements and other non-edge switch elements.

The system of some embodiments only controls edge switches (i.e., only maintains data in the NIB regarding edge switches) for several reasons. Controlling edge switches provides the system with a sufficient mechanism for maintaining isolation between computing devices, which is needed, as opposed to maintaining isolation between all switch elements, which is not needed. The interior switches forward between switching elements. The edge switches forward between computing devices and other network elements. Thus, the system can maintain user isolation simply by controlling the edge switching elements because the edge switching elements are the last switches in line to forward packets to hosts.

Controlling only edge switches also allows the system to be deployed independent of concerns about the hardware vendor of the non-edge switches. Deploying at the edge allows the edge switches to treat the internal nodes of the network as simply a collection of elements that moves packets without considering the hardware makeup of these internal nodes. Also, controlling only edge switches makes distributing switching logic computationally easier. Controlling only edge switches also enables non-disruptive deployment of the system. Edge switching solutions can be added as top of rack switches without disrupting the configuration of the non-edge switches.

In addition to controlling edge switches, the network control system of some embodiments also utilizes and controls non-edge switches that are inserted in the switch network hierarchy to simplify and/or facilitate the operation of the controlled edge switches. For instance, in some embodiments, the control system requires the switches that it controls to be interconnected in a hierarchical switching architecture that has several edge switches as the leaf nodes in this switching architecture and one or more non-edge switches as the non-leaf nodes in this architecture. In some such embodiments, each edge switch connects to one or more of the non-leaf switches, and uses such non-leaf switches to facilitate its communication with other edge switches. Examples of functions that such non-leaf switches provide to facilitate such communications between edge switches in some embodiments include (1) routing of a packet with an unknown destination address (e.g., unknown MAC address) to the non-leaf switch so that this switch can route this packet to the appropriate edge switch, (2) routing a multicast or broadcast packet to the non-leaf switch so that this switch can convert this packet to a series of unicast packets to the desired destinations, (3) bridging remote managed networks that are separated by one or more networks, and (4) bridging a managed network with an unmanaged network.

Some embodiments employ one level of non-leaf (non-edge) switches that connect to edge switches and in some cases to other non-leaf switches. Other embodiments, on the other hand, employ multiple levels of non-leaf switches, with each level of non-leaf switch after the first level serving as a mechanism to facilitate communication between lower level non-leaf switches and leaf switches. In some embodiments, the non-leaf switches are software switches that are implemented by storing the switching tables in the memory of a standalone computer instead of an off the shelf switch. In some embodiments, the standalone computer may also be executing in some cases a hypervisor and one or more virtual machines on top of that hypervisor. Irrespective of the manner by which the leaf and non-leaf switches are implemented, the NIB of the control system of some embodiments stores switching state information regarding the leaf and non-leaf switches.

The above discussion relates to the control of edge switches and non-edge switches by a network control system of some embodiments. In some embodiments, edge switches and non-edge switches (leaf and non-leaf nodes) may be referred to as managed switches. This is because these switches are managed by the network control system (as opposed to unmanaged switches, which are not managed by the network control system, in the network) in order to implement logical data path sets through the managed switches.

In addition to using the NIB to store switching-element data, the virtualized network-control system of some embodiments also stores other storage structures to store data regarding the switching elements of the network. These other storage structures are secondary storage structures that supplement the storage functions of the NIB, which is the primary storage structure of the system while the system operates. In some embodiments, the primary purpose for one or more of the secondary storage structures is to back up the data in the NIB. In these or other embodiments, one or more of the secondary storage structures serve a purpose other than backing up the data in the NIB (e.g., for storing data that are not in the NIB).

In some embodiments, the NIB is stored in system memory (e.g., RAM) while the system operates. This allows for fast access of the NIB records. In some embodiments, one or more of the secondary storage structures, on the other hand, are stored on disks, or other non-volatile memories, which can be slower to access. Such non-volatile disks or other non-volatile memories, however, improve the resiliency of the system as they allow the data to be stored in a persistent manner.

The system of some embodiments uses multiple types of storages in its pool of secondary storage structures. These different types of structures store different types of data, store data in different manners, and provide different query interfaces that handle different types of queries. For instance, in some embodiments, the system uses a persistent transactional database (PTD) and a hash table structure. The PTD in some embodiments is a database that is stored on disk or other non-volatile memory. In some embodiments, the PTD is a commonly available database, such as MySQL or SQLite. The PTD of some embodiments can handle complex transactional queries. As a transactional database, the PTD can undo a series of earlier query operations that it has performed as part of a transaction when one of the subsequent query operations of the transaction fails.

Moreover, some embodiments define a transactional guard processing (TGP) layer before the PTD in order to allow the PTD to execute conditional sets of database transactions. The TGP layer allows the PTD to avoid unnecessary later database operations when conditions of earlier operations are not met. The PTD in some embodiments stores the exact replica of the data that is stored in the NIB, while in other embodiments it stores only a subset of the data that is stored in the NIB. In some embodiments, some or all of the data in the NIB is stored in the PTD in order to ensure that the NIB data will not be lost in the event of a crash of the NOS or the NIB.

While the system is running, the hash table in some embodiments is not stored on a disk or other non-volatile memory. Instead, it is a storage structure that is stored in volatile system memory when the system is running. When the system is powered down, the content of the hash table is stored on disk. The hash table uses hashed indices that allow it to retrieve records in response to queries. This structure combined with the hash table's placement in the system's volatile memory allows the table to be accessed very quickly. To facilitate this quick access, a simplified query interface is used in some embodiments. For instance, in some embodiments, the hash table has just two queries, a Put query for writing values to the table and a Get query for retrieving values from the table. The system of some embodiments uses the hash table to store data that the NOS needs to retrieve very quickly. Examples of such data include network entity status, statistics, state, uptime, link arrangement, and packet handling information. Furthermore, in some embodiments, the NOS uses the hash tables as a cache to store information that is repeatedly queried, such as flow entries that will be written to multiple nodes.

Using a single NOS instance to control a network can lead to scaling and reliability issues. As the number of network elements increases, the processing power and/or memory capacity that are required by those elements will saturate a single node. Some embodiments further improve the resiliency of the control system by having multiple instances of NOS running on one or more computers, with each instance of NOS containing one or more of the secondary storage structures described above. Each instance in some embodiments not only includes a NOS instance, but also includes a virtualization application instance and/or a control application instance. In some of these embodiments, the control and/or virtualization applications partition the workload between the different instances in order to reduce each instance's control and/or virtualization workload. Also, in some embodiments, the multiple instances of NOS communicate the information stored in their secondary storage layers to enable each instance of NOS to cover for the others in the event of a NOS instance failing. Moreover, some embodiments use the secondary storage layer (i.e., one or more of the secondary storages) as a channel for communicating between the different instances.

The distributed, multi-instance control system of some embodiments maintains the same switch element data records in the NIB of each instance, while in other embodiments, the system allows NIBs of different instances to store different sets of switch element data records. Some embodiments that allow different instances to store different portions of the NIB, divide the NIB into N mutually exclusive portions and store each NIB portion in one NIB of one of N controller instances, where N is an integer value greater than 1. Other embodiments divide the NIB into N portions and store different NIB portions in different controller instances, but allow some or all of the portions to partially (but not completely) overlap with the other NIB portions.

The hash tables in the distributed control system of some embodiments form a distributed hash table (DHT), with each hash table serving as a DHT instance. In some embodiments, the DHT instances of all controller instances collectively store one set of records that is indexed based on hashed indices for quick access. These records are distributed across the different controller instances to minimize the size of the records within each instance and to allow for the size of the DHT to be increased by adding other DHT instances. According to this scheme, each DHT record is not stored in each controller instance. In fact, in some embodiments, each DHT record is stored in at most one controller instance. To improve the system's resiliency, some embodiments, however, allow one DHT record to be stored in more than one controller instance, so that in case one instance fails, the DHT records of that failed instance can be accessed from other instances. Some embodiments do not allow for replication of records across different DHT instances or allow only a small amount of such records to be replicated because these embodiments store in the DHT only the type of data that can be quickly re-generated.

The distributed control system of some embodiments replicates each NIB record in the secondary storage layer (e.g., in each PTD instance and/or in the DHT) in order to maintain the records in the NIB in a persistent manner. For instance, in some embodiments, all the NIB records are stored in the PTD storage layer. In other embodiments, only a portion of the NIB data is replicated in the PTD storage layer. For instance, some embodiments store a subset of the NIB records in another one of the secondary storage records, such as the DHT.

By allowing different NOS instances to store the same or overlapping NIB records, and/or secondary storage structure records, the system improves its overall resiliency by guarding against the loss of data due to the failure of any NOS or secondary storage structure instance. For instance, in some embodiments, the portion of NIB data that is replicated in the PTD (which is all of the NIB data in some embodiments or part of the NIB data in other embodiments) is replicated in the NIBs and PTDs of all controller instances, in order to protect against failures of individual controller instances (e.g., of an entire controller instance or a portion of the controller instance).

In some embodiments, each of the storages of the secondary storage layer uses a different distribution technique to improve the resiliency of a multiple NOS instance system. For instance, as mentioned above, the system of some embodiments replicates the PTD across NOS instances so that every NOS has a full copy of the PTD to enable a failed NOS instance to quickly reload its PTD from another instance. In some embodiments, the system distributes the DHT fully or with minimal overlap across multiple controller instances in order to maintain the DHT instance within each instance small. This approach also allows the size of the DHT to be increased by adding additional DHT instances, and this in turn allows the system to be more scalable.

For some or all of the communications between the distributed instances, the distributed system of some embodiments uses coordination managers (CM) in the controller instances to coordinate activities between the different controllers. Examples of such activities include writing to the NIB, writing to the PTD, writing to the DHT, controlling the switching elements, facilitating intra-controller communication related to fault tolerance of controller instances, etc.

To distribute the workload and to avoid conflicting operations from different controller instances, the distributed control system of some embodiments designates one controller instance within the system as the master of any particular NIB portion (e.g., as the master of a logical data path set) and one controller instance within the system as the master of any given switching element. Even with one master controller, a different controller instance can request changes to different NIB portions and/or to different switching elements controlled by the master. If allowed, the master instance then effectuates this change and writes to the desired NIB portion and/or switching element. Otherwise, the master rejects the request.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 8 conceptually illustrates an electronic system with which some embodiments of the invention are implemented.

DETAILED DESCRIPTION

Figure 1B:
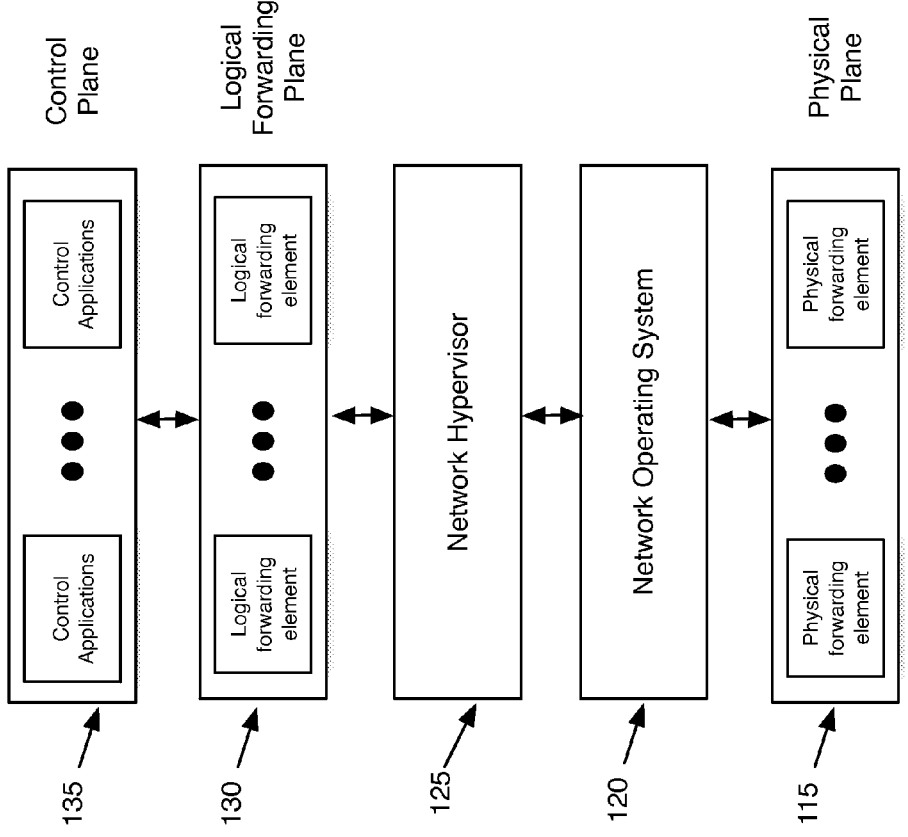
FIGS. 1a and 1b illustrate the difference between the common architecture today and the architecture of some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a robust scaling-out of network functionality by providing a software layer, called the network hypervisor, that sits between the network forwarding functions (i.e., the forwarding plane) and the network control interfaces (i.e., the control plane). The network hypervisor of some embodiments provides a logical abstraction of the network's forwarding functionality, so that network operators make their control decisions in terms of this abstraction, independent of the details of the underlying networking hardware. The network hypervisor of some embodiments may then "compile" commands placed against this abstraction into configurations of the underlying hardware. Accordingly, in some embodiments, there are two design challenges: (1) the choice of the network abstraction, and (2) the technology needed to compile the logical "abstract" controls into low-level configurations.

In some embodiments, the logical abstraction of the network is both familiar (so that it captures the notions of control that operators are familiar with) and expressive (so that it applies to a wide variety of present and future use cases). With the objective of compromising between these sometimes-conflicting goals, the network of some embodiments is modeled as a set of one or more logical (possibly interconnected) forwarding elements. In some embodiments, each forwarding element has a set of logical ports, a set of lookup tables, and some basic forwarding actions, such as counters, forwarding, header-rewriting, and encapsulation/decapsulation. In some embodiments, these elements also have capacities associated with some of these resources (e.g., line speeds, cross-section bandwidth, table sizes). In some embodiments, the control plane of the network (i.e., the software system used by operators to control the network) uses this logical abstraction to express the desired network functionality.

In some cases, the logical network is modeled as a single forwarding element that provides any-to-any connectivity. The desired network behavior of some embodiments is specified by the configuration of this large logical switch, in terms of access control rules, monitoring, and other forwarding features.

In other cases, more than a single logical forwarding element is used in the abstraction. Two such cases occur when (1) modeling a multi-tenant network so that each tenant model controls its own logical network element, and (2) exposing large latency physical links in networks, so that the control plane can treat their use separately. In the former case, some embodiments disconnect the logical forwarding elements and operate them by separate control planes (belonging to each tenant), so that typically each control plane is operating on a single logical forwarding element.

In some embodiments, this logical abstraction is not only used for static configuration of the network functionality, but instead can also be used by network control software to implement sophisticated dynamic control over the network. For example, as further described below, some embodiments implement and use an interface to turn a collection of physical routers into a single logical router that is participating in a routing protocol, such as Border Gateway Protocol (BGP). In some embodiments, the "configuration" of the logical router may therefore be programmatically determined by the implementation of BGP sitting on top of this logical interface. Thus, this logical abstraction of some embodiments allows operators to specify sophisticated dynamic control of network-wide behavior, independent of the underlying physical infrastructure.

Some embodiments rely on centralized network managements to compile these logical network control commands into hardware configurations. The network hypervisor of some embodiments is implemented using a network management system (such as Network Operating Systems described in U.S. patent application Ser. No. 13/177,538, now issued as U.S. Pat. No. 8,830,823, entitled "A Distributed Control Platform for Large-Scale Production Networks," filed concurrently herewith, that automatically provides a complete view of the physical network topology. Accordingly, in some embodiments, the network hypervisor is given two network views: (1) from above, it is given (by the control plane) a logical network view of the desired functionality, and (2) from below, it is given (by a centralized network management system) a view of the physical network topology. The job of the network hypervisor in some embodiments is to determine how to implement the desired logical functionality through configuration of the physical network. The configuration itself is done through the network management system.

The name "network hypervisor" is used to refer to the concept of virtualization. The software layer of some embodiments serves much the same function as a hypervisor on a host: providing a logical view of the functionality to the software above, and then implementing the desired functionality on the hardware below. The term "network virtualization" is often used to refer to carving a single physical network into several logical "slices". However, the network hypervisor of some embodiments is a superset of this slicing functionality, and provides a fuller virtualization of the network by providing a completely logical interface. In some embodiments, network "slices" are not independent of the underlying physical infrastructure, but instead are a way of multiplexing that infrastructure.

With this basic background in hand, several more detailed embodiments of the invention will now be described in the following sections. Section I describes the basic design of the network hypervisor. Section II then describes the network hypervisor's implementation. Section III next describes a few practical use cases for network hypervisor, such as (1) implementing a single, standard routing stack on top of a rack of commodity switches, (2) building a distributed virtual switching layer, and (3) creating a multi-tenant network infrastructure.

I. NETWORK ARCHITECTURE AND OPERATIONS

In some embodiments, the network can be thought of as having several distinct logical layers: (1) a control plane, (2) a logical forwarding plane, (3) a network hypervisor, (4) a network operating system, and (5) a physical forwarding plane. In some embodiments, the term control plane refers to the basic mechanisms used to express the desired network functionality. Traditionally, this term refers to controlling physical forwarding elements, through either manual configuration or programmatic control (as in routing algorithms). However, in some embodiments, the term control plane refers to the mechanisms used to control the logical forwarding plane (defined below), because of the insertion of the logical abstraction layer.

In some embodiments, the term logical forwarding plane refers to the logical abstraction of the network that, as mentioned before, is one or more logical forwarding elements. The logical elements of some embodiments have similar properties to their physical counterparts (e.g., lookup tables, ports, counters) as well as associated capacities (e.g., port speeds and/or bisectional bandwidth).

In some embodiments, the network hypervisor takes the logical forwarding plane and maps it into the underlying physical hardware through the network operating system. Lastly, the term physical forwarding plane in this document refers to the set of physical network forwarding elements.

Figure 1A:
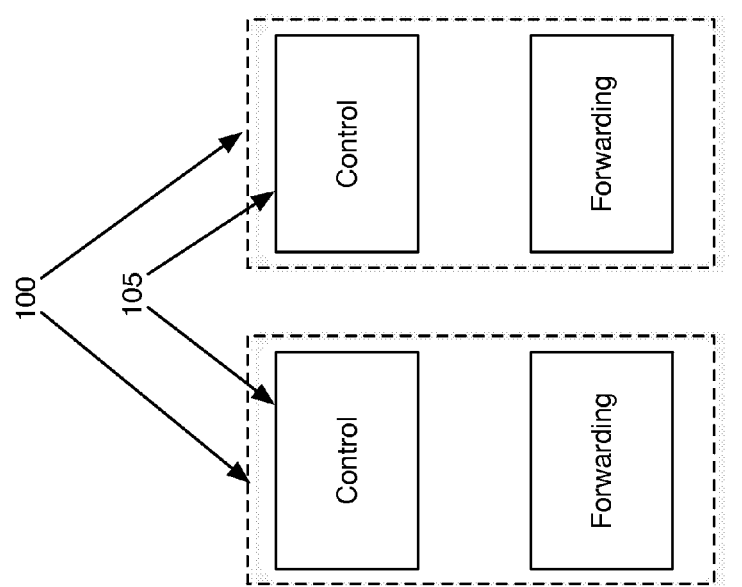

FIGS. 1a and 1b illustrate the difference between the common architecture today and the architecture of some embodiments of the invention. Specifically, FIG. 1a shows the common architecture today. As shown in this figure, each of the controls 105 is implemented on each switch 100 individually either by operator configuration, or through a distributed routing protocol.

FIG. 1b illustrates the network architecture of some embodiments. As shown in FIG. 1b, this architecture introduces a network hypervisor 125 as a new software layer that allows for the creation of one or more logical forwarding elements that model the desired behavior of one or more sets of datapaths, or sub-networks of datapaths. Specifically, as shown in FIG. 1b, the network hypervisor 125 (i.e., the single logical forwarding element) is introduced on top of a network operating system 120, which resides on top of a physical forwarding plane 115.

As mentioned above, the network hypervisor 125 of some embodiments uses the network operating system 120 to configure the underlying physical network. In other words, the network operating system 120 in some embodiments provides the higher level (more abstract) controls that are used by the network hypervisor to specify configurations for the physical network. In FIG. 1b, the physical network is illustrated as a physical forwarding plane 115 that includes one or more physical forwarding elements. The physical forwarding elements in some embodiments can include physical or virtual switches or other network interconnects.

Residing on top of the network hypervisor 125 is a logical forwarding plane 130 that includes one or more logical forwarding elements. In some embodiments, an administrator can use the network hypervisor 125 to specify each of the logical forwarding elements. As mentioned above, each logical forwarding element models the desired behavior of a set of data paths that is associated with one particular group of users in the network. As further described below, the network hypervisor of some embodiments is responsible for configuring the physical forwarding elements (through the network operating system) so that the network implements the desired behavior as specified by the logical forwarding plane.

Residing on top of the logical forwarding plane is a control plane 135. As shown in FIG. 1b, the control pane 135 includes one or more control applications that manage multiple physical forwarding elements by controlling the logical forwarding elements; as mentioned above, the logical forwarding elements are used by the network hypervisor to configure the physical forwarding elements. In this manner, the control plane applications can control the physical forwarding elements while remaining insulated from the underlying physical topology.

A. Logical Forwarding Plane

Figure 2:
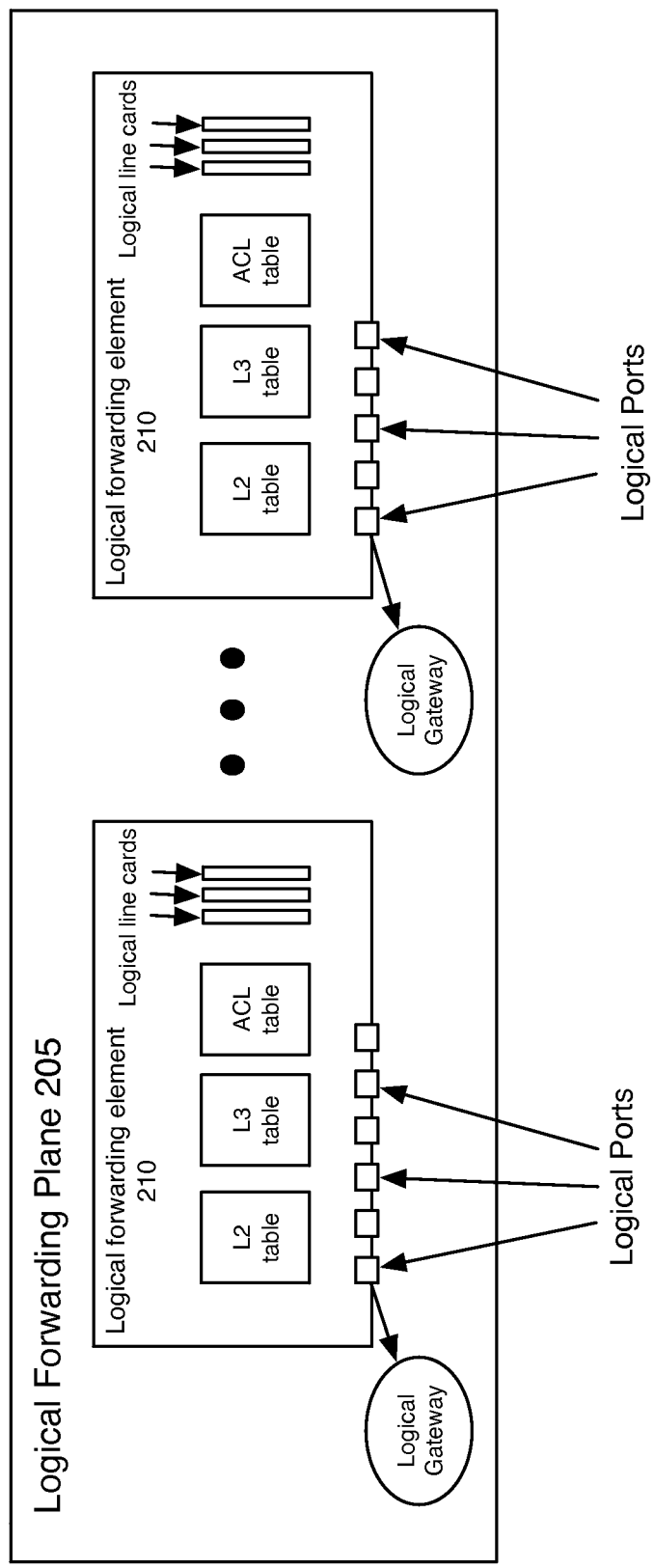
FIG. 2 illustrates an example of a logical forwarding plane with multiple logical forwarding elements.

In some embodiments, a network administrator interacts with the network hypervisor to create different logical forwarding elements in the logical forwarding plane for different user group in the network. FIG. 2 illustrates an example of a logical forwarding plane 205 with multiple logical forwarding elements 210. As shown in this figure, a logical forwarding element 210 in some embodiments includes one or more lookup tables, a set of control functionalities and rules, and a set of logical ports.

FIG. 2 shows the logical forwarding element 210 to include L2, L3, and ACL tables, and a set of logical line cards that specify control functionalities and rules for the forwarding element 210. In this example, the network administrator can establish rules and policies for a user group by updating the entries in the L2, L3, and ACL tables and the other control functionalities and rules in the forwarding element 210. In some embodiments, the particular implementation of the logical forwarding element is designed around OpenFlow (described in Special Interest Group on Data Communication's (SIGCOMM) Computer Communication Review (CCR) 38, 2 entitled "OpenFlow: Enabling Innovation in Campus Network" dated 2008), so that a more generalized table structure is built around a pipeline of Ternary Content-Addressable Memory (TCAMs) with forwarding actions specified for each rule. The forwarding actions correspond to the actions available in the physical forwarding plane, notably header overwriting, enqueuing, filtering, and multicast/anycast groupings. In some embodiments, this structure provides quite a bit of flexibility allowing for support of forwarding rules, ACLs, Switch Port Analyzer (SPAN), and other primitives.

FIG. 2 also shows that each logical forwarding element 210 has an associated logical gateway, or shares an associated logical gateway with one or more other logical forwarding elements. In other words, the network hypervisor of some embodiments provides support of logical gateways that can be connected to logical datapaths. A logical gateway provides a bridge between the logical and physical networks such that migration is hidden form the logical view. In logical space, the logical gateway is allocated and IP address and an IP subnet which is used by the hosts connected to the logical datapath as the "next hop". The logical gateway will then be responsible for advertising the logical subnet to the physical network. The subnet can be advertised as a single prefix to a single location (requiring the hypervisor to then route traffic to the actual locations of the VMs), or the logical gateway can advertise individual routes from the location of the VMs. The important property that the logical gateway maintains is, if the VMs move, the logical subnet remains unchanged, and therefore the VMs can maintain their IP address. In this manner, the logical gateway provides the "glue" to the physical world. The logical forwarding elements provide the inter-VM network connectivity model, and support for policy (QoS, ACLS, etc.) and service interposition (as logical line cards for example).

The set of logical ports of the logical forwarding element of some embodiments can be bound to physical ports, or to other port abstractions such as virtual machine interfaces, VLANs, or tunnels. Ports of some embodiments may appear and leave dynamically as they are either administratively added, or the component they are bound to fails or leaves. In some embodiments, ports maintain much of the same qualities of their physical analogs including rx/tx counters, MTU, speed, error counters, and carrier signal.

The above-described logical element interface is designed in some embodiments to be both familiar and expressive. It also has the added advantage of being compatible with current hardware capabilities, so that it can be efficiently implemented. Moreover, it is compatible with current control plane mechanisms, making integration easier.

Logical context is another general concept that is useful in describing some embodiments of the invention. In some embodiments, as a packet traverses the network, it can be thought of as moving in both the logical forwarding plane and the physical forwarding plane. When a switch is making a decision (based on its physical tables and the packet header) about how to forward a packet, it is often useful to know where that packet is in the logical forwarding plane: this information is called the logical context of the packet.

B. Physical Forwarding Plane

In some embodiments, the forwarding elements are traditional hardware switches with standard forwarding silicon. As further discussed below, the network hypervisor of some embodiments is responsible for configuring the physical forwarding elements so that the network implements the desired behavior as specified by the logical forwarding plane. In order for the physical forwarding elements to carry out their assigned tasks, these elements do the following for each packet in some embodiments: (1) map the incoming packet to the correct logical context, (2) make a logical forwarding decision, (3) map the logical forwarding decision back to the physical next-hop address, and (4) make physical forwarding decision in order to send packets to the physical next hop. In some embodiments, the network hypervisor configures the physical forwarding elements (e.g., the L2, L3 and ACL tables in these elements) to perform these four operations. In other embodiments, the network hypervisor configures the physical forwarding elements to perform only some of these operations, e.g., configures them for only the first three operations, leaving the configuration of the physical forwarding decision to the physical forwarding plane logic.

Figure 3:
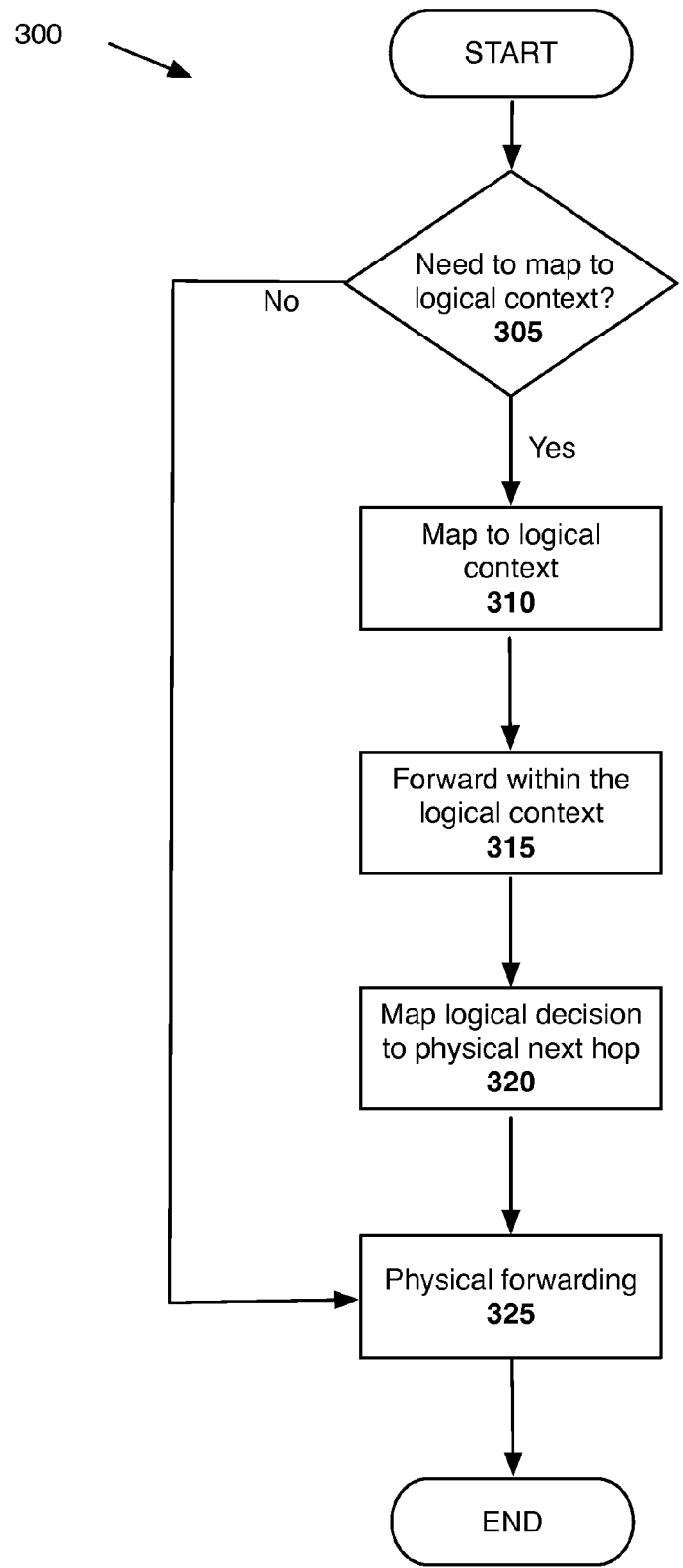
FIG. 3 illustrates a conceptual process for performing these operations by some embodiments of the invention.

FIG. 3 illustrates a conceptual process for performing these operations by some embodiments of the invention. As shown in this figure, the process 300 determines (at 305) whether a mapping of packets to the correct logical context is needed. Such a mapping is needed when multiple logical forwarding elements are multiplexed over the same physical switch. Thus, in such a situation, a packet on ingress is mapped (at 70) to the correct logical context, and then transitions to 75. However, when the current switch does not contain the logical forwarding state for a given packet, the switch of some embodiments simply performs a physical forwarding decision (i.e., skips from 305 to 320). Also, if all the physical switches are implementing only a single logical forwarding element, the mapping becomes a no-op because logical addressing may be used in the physical network. In this situation, the process transitions from 305 to 325.

In the abstract, different embodiments use different fields to map a packet to a logical context. In some embodiments, the field could be, for example, an identifying tag such as an MPLS header, or the ingress port. However, in order to provide transparency to end systems, some embodiments do not expose the tag used for identifying logical contexts to the systems connecting to the logical switch. In general, this means that the first physical switch receiving a packet tags it to mark the context, and the last switch removes the tag. How the first tag is chosen depends largely on the deployment environment, which will be discussed further in Section II.

When the process reaches 75 (e.g., once a packet is mapped to its logical context), the physical switch of some embodiments performs a forwarding decision that is meaningful within the logical context. This could be, for example, an L2 lookup for the logical switch or a sequence of lookups required for a logical L3 router. However, if the physical switch executing the logical decision does not have enough capacity to have all the logical state, the logical decision executed at that switch in some embodiments may be only a step in overall logical decision that needs be executed; therefore, in this situation, the packet may require further logical processing before leaving the logical forwarding element.

After 75, the process maps (at 320) the logical decision to a physical lookup. The result of a logical forwarding decision (assuming the packet was not dropped) is one or more egress ports on the logical forwarding element. Once these are determined, the network may send the packets to the physical objects to which these egress ports are bound. This could be, for example, a physical port on another physical switch, or a virtual port of a virtual machine on a different physical server.

Thus, in some embodiments, the network maps (at 320) the logical egress port to the physical next hop. In some embodiments, the logical and physical networks share distinct (though potentially overlapping) address spaces. Thus, once the physical address is found for the next hop, the (logical) packet can be encapsulated to be transferred to the next hop physical address. When a logical forwarding decision is distributed across multiple physical components, the "next hop" will be the next physical component that will continue to execute the logical forwarding decision rather than a logical egress port.

Finally, at 325, the physical forwarding takes place. The physical forwarding decision in some embodiments is responsible for forwarding the packet out of the correct physical egress port based on the physical address determined by the previous mapping step. This requires a third (or more) lookup over the new physical header (which we assume was created in the previous step). It is worthwhile to note that if the physical switches of the network have only one logical context, the previous two steps may become no-ops.

C. Control Data Pipeline

Figure 4:
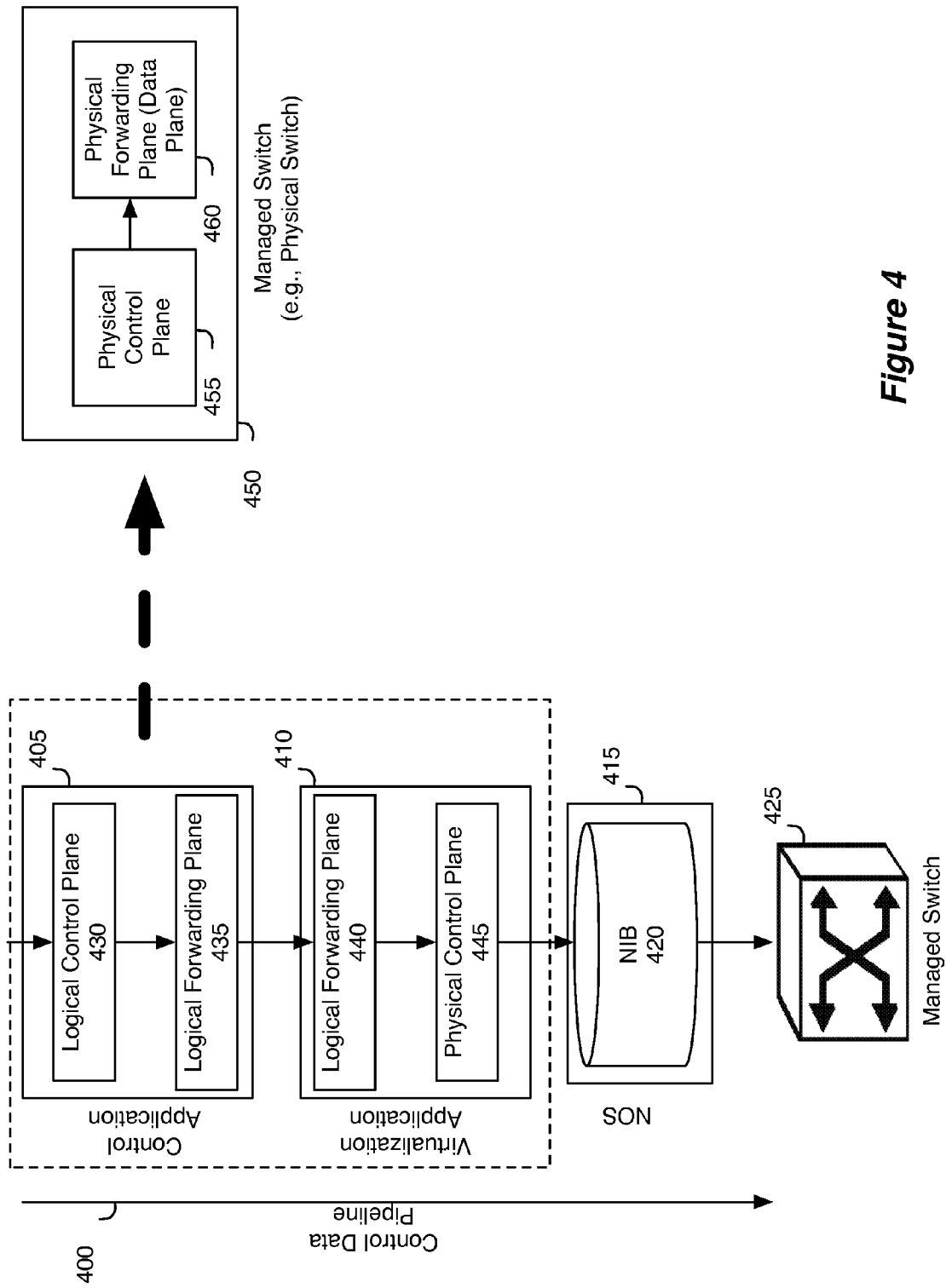
FIG. 4 illustrates propagation of instructions to control a managed switch through the various processing layers of the controller instances of some embodiments.

FIG. 4 elaborates on the propagation of the instructions to control a managed switch through the various processing layers of the controller instances of some embodiments of the invention. This figure illustrates a control data pipeline 400 that translates and propagates control plane data through three processing layers of the same or different controller instances to a managed switch 425. These three layers are the control application 405, the virtualization application 410, and the NOS 415. In some embodiments, these three layers are in the same controller instance. However, other arrangements of these layers exist in other embodiments. For instance, in other embodiments, only the control and virtualization applications 405 and 410 and the NIB that initially stores the output of the virtualization application 410 are in the same controller instance, but the functionality to propagate the generated physical control plane data reside in a NOS of another controller instance (not shown). In these other embodiments, the physical control plane data is transferred from the initial NIB to the NIB of a NOS of the other controller instance, before this other NOS pushes the control plane data to the managed switch.

As shown in FIG. 4, the control application 405 in some embodiments has two logical planes 430 and 435 that can be used to express the input and output to this application. In some embodiments, the first logical plane 430 is a logical control plane that includes a collection of higher-level constructs that allow the control application and its users to specify one or more logical data path sets within the logical control plane for one or more users. The second logical plane 435 in some embodiments is the logical forwarding plane, which represents the logical data path sets of the users in a format that can be processed by the virtualization application 410. In this manner, the two logical planes 430 and 435 are virtualization space analogs of the control and forwarding planes 455 and 460 that are typically can be found in a typical managed switch 450, as shown in FIG. 4.

In some embodiments, the control application 405 defines and exposes the logical control plane constructs with which the application itself or users of the application define different logical data path sets within the logical control plane. For instance, in some embodiments, the logical control plane data 430 includes logical ACL data, etc. Some of this data (e.g., logical ACL data) can be specified by the user, while other such data (e.g., the logical L2 or L3 records) are generated by the control application and may not be specified by the user. In some embodiments, the control application 405 generates and/or specifies such data in response to certain changes to the NIB (which indicate changes to the managed switches and the managed data path sets) that the control application 405 detects.

In some embodiments, the logical control plane data (i.e., the LDPS data that is expressed in terms of the control plane constructs) can be initially specified without consideration of current operational data from the managed switches and without consideration of the manner by which this control plane data will be translated to physical control plane data. For instance, the logical control plane data might specify control data for one logical switch that connects five computers, even though this control plane data might later be translated to physical control data for three managed switches that implement the desired switching between the five computers.

The control application includes a set of modules for converting any logical data path set within the logical control plane to a logical data path set in the logical forwarding plane 435. In some embodiments, the control application 405 uses the nLog table mapping engine to perform this conversion. The control application's use of the nLog table mapping engine to perform this conversion is further described below. The control application also includes a set of modules for pushing the LDPS from the logical forwarding plane 435 of the control application 405 to a logical forwarding plane 440 of the virtualization application 410.

The logical forwarding plane 440 includes one or more logical data path sets of one or more users. The logical forwarding plane 440 in some embodiments includes logical forwarding data for one or more logical data path sets of one or more users. Some of this data is pushed to the logical forwarding plane 440 by the control application, while other such data are pushed to the logical forwarding plane by the virtualization application detecting events in the NIB 420.

In addition to the logical forwarding plane 440, the virtualization application 410 includes the physical control plane 445. The physical control plane 445 includes one or more physical control path sets of one or more users. The virtualization application includes a set of modules for converting any LDPS within the logical forwarding plane 440 to a physical control data path set in the physical control plane 445. In some embodiments, the virtualization application 410 uses the nLog table mapping engine to perform this conversion. The virtualization application also includes a set of modules (not shown) for pushing the physical control plane data from the physical control plane 445 of the virtualization application 410 into the NIB 420 of the NOS 415.

From the NIB, the physical control plane data is later pushed into the managed switch 450, as shown in FIG. 4. The physical control plane data in some instances of some embodiments is pushed to the managed switch by the NOS of the same controller instance that has the control application 405 and virtualization application, but in other instance is pushed to the managed switch by the NOS of another controller instance (not shown). The managed switch 450 then converts this physical control plane data to physical forwarding plane data that specifies the forwarding behavior of the managed switch.

In some embodiments, the physical control plane data that is propagated to the managed switch 450 allows this switch to perform the logical data processing on data packets that it processes in order to effectuate the processing of the logical data path sets specified by the control application. In some such embodiments, physical control planes include control plane data for operating in the physical domain and control plane data for operating in the logical domain. In other words, the physical control planes of these embodiments include control plane data for processing network data (e.g., packets) through managed switches to implement physical switching and control plane data for processing network data through managed switches in order to implement the logical switching. In this manner, the physical control plane facilitates implementing logical switches across managed switches.

In addition to pushing physical control plane data to the NIB 420, the control and virtualization applications 405 and 410 also store logical control plane data and logical forwarding plane data in the NIB. These embodiments store such data in the NIB for a variety of reasons. For instance, in some embodiments, the NIB 420 serves as a medium for communications between different controller instances, and the storage of such data in the NOB facilitates the relaying of such data across different controller instances.

FIG. 4 illustrates the control data pipeline 400 through three processing layers of the same or different controller instances to a managed switch 425. However, in some embodiments, the control data pipeline 400 may have two processing layers instead of three with the upper layer being a single application that performs the functionalities of both the control application 405 and the virtual application 410. The dashed box encompassing the two applications indicates that a single virtualization application (also called network hypervisor) may replace these two applications 405 and 410 in some embodiments. In such embodiments, the control application 405 would form the front end of this network hypervisor, and would create and populate the logical data path sets. The virtualization application 410 in these embodiments would form the back end of the network hypervisor, and would convert the logical data path sets to physical data path sets that are defined in the physical control plane.

Figure 5:
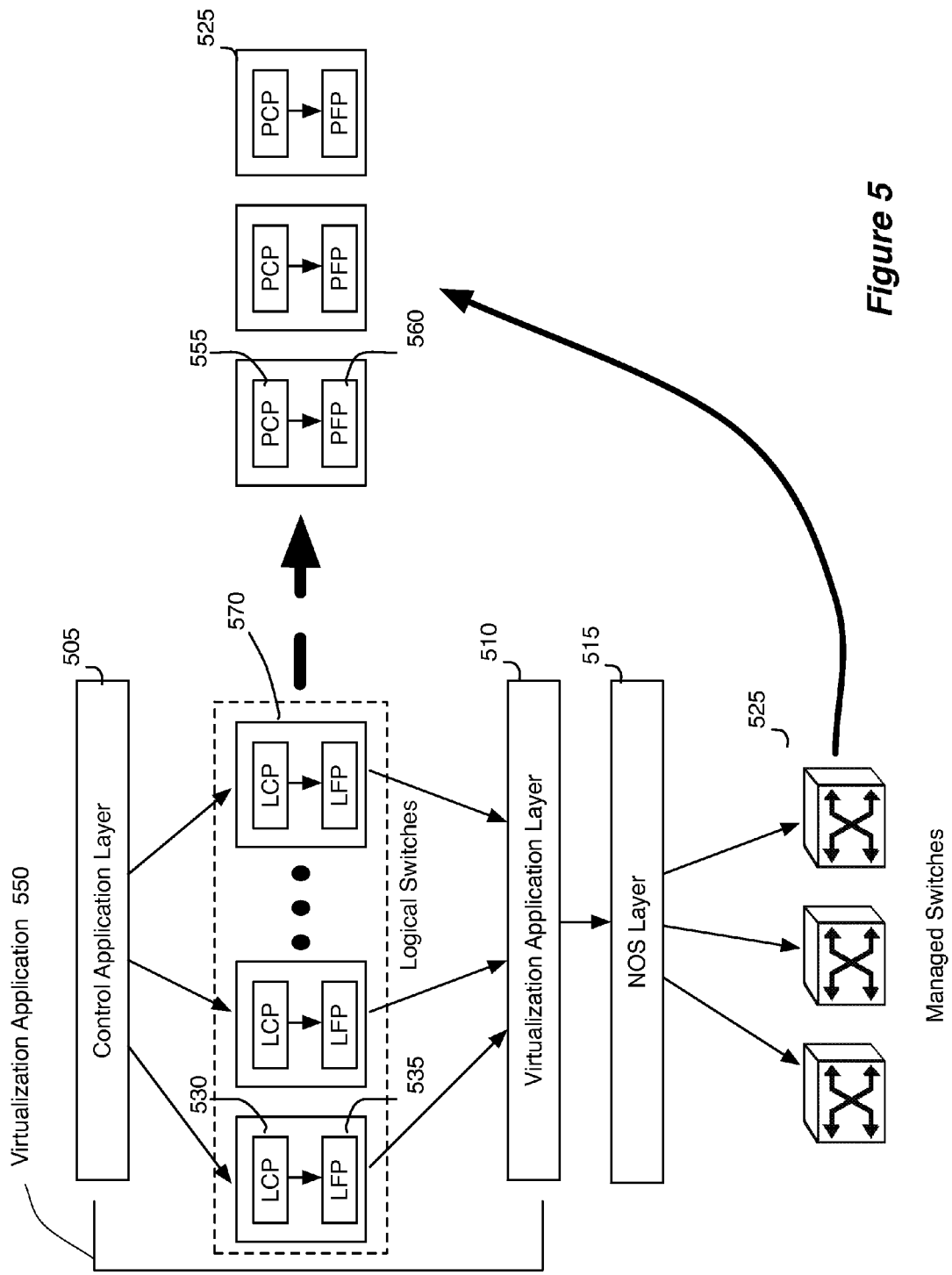
FIG. 5 illustrates propagation of instructions to control several managed switches through the various processing layers of the controller instances of some embodiments.

FIG. 5 illustrates another perspective on the operation of the control, virtualization, and NOS applications of some embodiments. The perspective provided in this figure is meant to emphasize that one or more controller instances can execute these applications in a distributed manner in parallel. Specifically, this figure replaces the control application 405, the virtualization application 410, and the NOS 415, with a control layer 505, a virtualization layer 510, and a NOS layer 515. Each of these layers represents one or more applications that can be executing in parallel on one or more controller instances. Collectively these three layers represent a control system that can be operated as a single controller instance, or can be operated in a distributed manner by several controller instances.

FIG. 5 is also meant to provide an example of logical data path sets that are created by the control applications of some embodiments, and the mapping of the created logical data path sets to the resources of the managed switches. In this example, the logical data path sets are several logical switches 570 that are specified by the control application layer 505. A logical switch in some embodiments is simulated/conceptual switch that is defined (e.g., by a user) to conceptually describe a set of switching behaviors for a switch. The control system of some embodiments (such as the system illustrated in FIG. 5) implements this logical switch across one or more physical switches, which may be hardware switches, software switches, or virtual switches defined on top of other switches.

Each logical switch has two logical planes 530 and 535 that can be used to express the input and output to the logical switch. In some embodiments, the logical plane 530 is a logical control plane (denoted by "LCP" in the figure) that includes a collection of higher-level constructs that allow the control application layer and its user to specify one or more logical data path sets within the logical control plane for the user. The second logical plane 535 in some embodiments is the logical forwarding plane (denoted by "LFP" in the figure), which represents the logical data path sets of the user in a format that can be processed by the virtualization application layer 510. Because of these two logical planes 530 and 535, the logical switches appear as virtualization space analogs of the control and forwarding planes 555 and 560 that typically can be found in managed switches, as shown in FIG. 5.

This figure then illustrates that through the virtualization application layer 510 and the NOS layer 515, the logical switches 570 can be implemented in three managed switches 525. The number of logical switches 570 may be less or more than three. That is, the number of logical switches 570 in some embodiments does not have to match to the number of managed switches that implement the logical switches. To implement the logical switches 570 in the three managed switches, the virtualization application layer 510 converts the logical forwarding plane data of the logical switches into physical control plane data, and the NOS layer 515 pushes this data to the managed switches 525. As mentioned above, the pushed physical control plane data allows the managed switches to perform physical switching operations in both the physical and logical data processing domains.

D. Architecture

Figure 6:
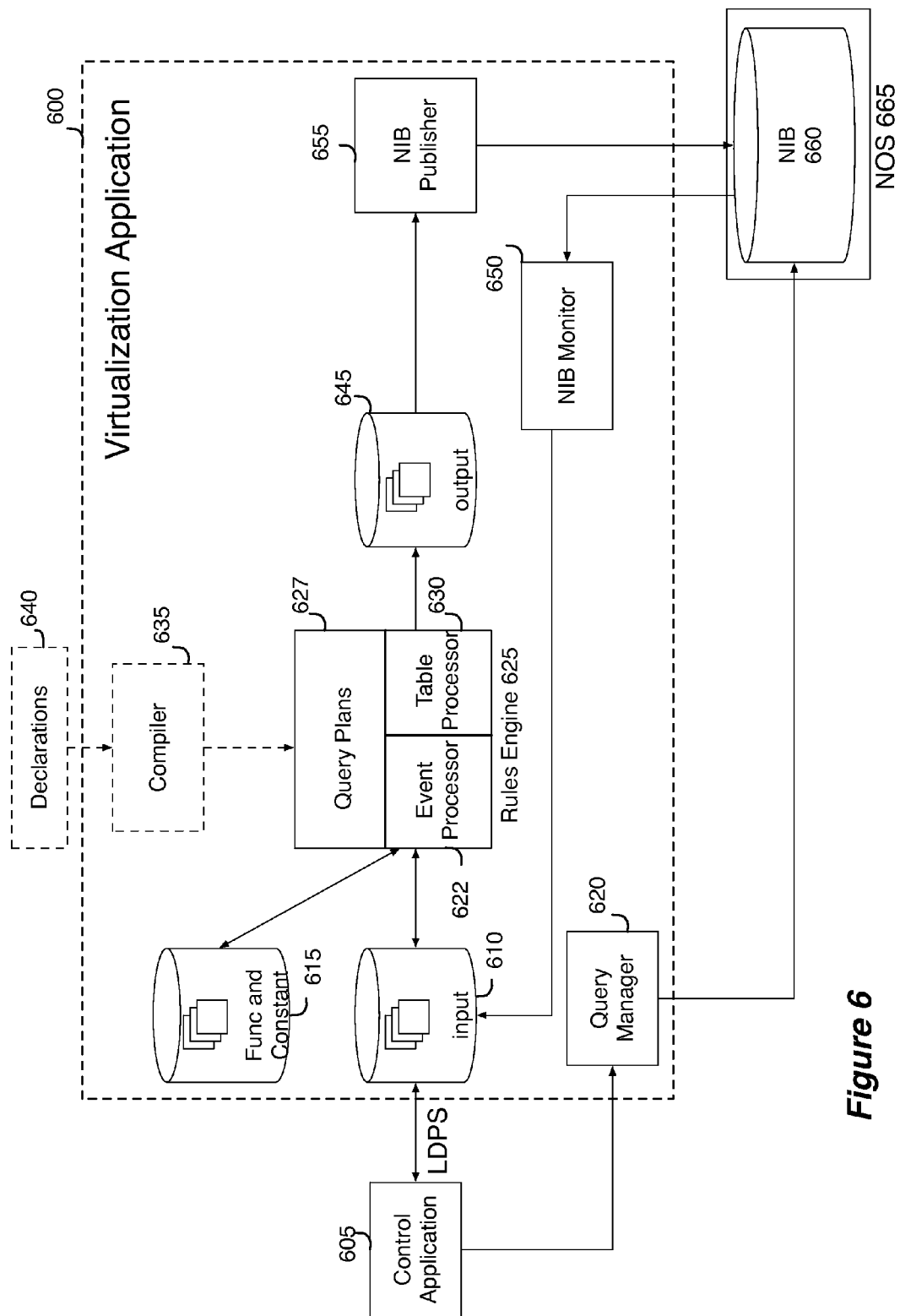
FIG. 6 illustrates a virtualization application of some embodiments.

FIG. 6 illustrates a virtualization application 600 of some embodiments of the invention. This application 600 is used in some embodiments as the virtualization application 1430 of FIG. 14. The virtualization application 600 uses an nLog table mapping engine to map input tables that contain LDPS data tuples to data tuples for defining managed switching elements, attributes of the managed switching elements, and flow entries for the managed switching elements. This application resides between a control application 605 that generates LDPS data tuples, and a NOS 665 that contains a NIB 660 that stores the data tuples generated by the nLog table mapping engine. More specifically, the control application 605 allows different users to define different logical data path sets (LDPS), which specify the desired switching configurations of the users. The control application 605 also reacts to changes in the NIB to modify the LDPS'. The virtualization application 600 through its mapping operations converts each of the LDPS of each user into a set of data tuples to populate the NIB. The virtualization application then populates the NIB 655 with the generated sets of data tuples. When the NOS 665 subsequently propagates the NIB data tuples for a particular user to the switching elements 660, the NOS completes the deployment of the user's switching configuration to one or more switching elements. In some embodiments, the virtualization application is executed on the same machine with the control application and the NOS. However, the virtual application, the control application, and the NOS do not have to run on the same machine in other embodiments. That is, one of these applications or each of these applications may run on a different computer.

As shown in FIG. 6, the virtualization application 600 includes a set of rule-engine input tables 610, a set of function and constant tables 615, a query manager 620, a rules engine 625, a set of rule-engine output tables 645, a NIB monitor 650, a NIB publisher 655, and a compiler 635. The compiler 635 is one component of the application that operates at a different instance in time than the application's other components. The compiler operates when a developer needs to specify the rules engine for a particular control application and/or virtualized environment, whereas the rest of the application's modules operate at run time when the application interfaces with the control application and the NOS to deploy and monitor logical data path sets specified by one or more users.

In some embodiments, the compiler 635 takes a relatively small set (e.g., few hundred lines) of declarative instructions 640 that are specified in a declarative language and converts these into a large set (e.g., thousands of lines) of code that specify the operation of the rules engine 625, which performs the application's table mapping as further described below. As such, the compiler greatly simplifies the virtualization application developer's process of defining and updating the virtualization application. This is because the compiler allows the developer to use a high level programming language that allows a compact definition of the virtualization application's complex mapping operation and to subsequently update this mapping operation in response to any number of changes (e.g., changes in the networking functions supported by the virtualization application, changes to desired behavior of the virtualization application, etc.).

In some embodiments, the rule-engine (RE) input tables 610 include tables with logical data and/or switching configurations (e.g., access control list configurations, private virtual network configurations, port security configurations, etc.) specified by the user and/or the virtualization application. They also include in some embodiments tables that contain physical data (i.e., non-logical data) from the switching elements managed by the virtualized control system. In some embodiments, such physical data includes data regarding the managed switching elements (e.g., physical control plane data) and other data regarding network configuration employed by the virtualized control system to deploy the different LDPS' of the different users.

The RE input tables 610 are partially populated by the LDPS data (e.g., by logical forwarding plane data) provided by the control application 605. The control application generates part of the LDPS data based on user input regarding the logical data path sets. It also generates part of the LDPS data by monitoring the NIB to identify changes in the managed switching element infrastructure that would require modification to the LDPS data. In addition to the control application 605, the NIB monitor 650 partially populates the RE input tables 610 with some or all of the data that the NIB monitor collects from the NIB. The operation of the NIB monitor will be further described below.

In addition to the RE input tables 610, the virtualization application 600 includes other miscellaneous tables 615 that the rules engine 625 uses to gather inputs for its table mapping operations. These tables 615 include constant tables 615 that store defined values for constants that the rules engine 625 needs to perform its table mapping operations. For instance, constant tables 615 may include a constant "zero" that is defined as the value 0, a constant "dispatch_port_no" as the value 4000, a constant "broadcast_MAC_addr" as the value 0xFF:FF:FF:FF:FF:FF. (A dispatch port in some embodiments is a port that specifies that the managed switch should reprocess the packet based on another flow entry.

When the rules engine 625 references constants, the corresponding value defined for the constants are actually retrieved and used. In addition, the values defined for constants in the constant table 615 may be modified and/or updated. In this manner, the constant table 615 provides the ability to modify the value defined for constants that the rules engine 625 references without the need to rewrite or recompile code that specifies the operation of the rules engine 625.

The tables 615 further include function tables 615 that store functions that the rules engine 625 needs to use to calculate values needed to populate the output tables 645. One example of such a function is a hash function that the rules engine uses to compute hash values for distributing DHT operations as well as load balancing traffic between lower level switches and higher level switches in a hierarchical switching architecture. The rules engine 625 performs table mapping operations that specify one manner for implementing the LDPS' within the managed switching element infrastructure. Whenever one of the RE input tables is modified, the rules engine performs a set of table mapping operations that may result in the modification of one or more data tuples in one or more RE output tables. The modification of the output table data tuples, in turn, may cause the NIB to be modified in order to establish and/or modify the implementation of a particular user's LDPS in the managed switching element infrastructure.

As shown in FIG. 6, the rules engine 625 includes an event processor 622, several query plans 627, and a table processor 630. In some embodiments, each query plan is a set of join operations that are to be performed upon the occurrence of a modification to one of the RE input table. Such a modification is referred to below as an input table event. Each query plan is generated by the compiler 635 from one declaratory rule in the set of declarations 640. In some embodiments, the query plans are defined by using the nLog declaratory language.

In some embodiments, the compiler 635 does not just statically generate query plans but rather dynamically generates query plans based on performance data it gathers. The complier 635 in these embodiments generates an initial set of query plans and let the rules engine operate with the initial set of query plans. The virtualization application gathers the performance data or receives performance feedbacks (e.g., from the rules engine). Based on this data, the compiler is modified so that the virtualization application or a user of this application can have the modified compiler modify the query plans while the rules engine is not operating or during the operation of the rules engine.

For instance, the order of the join operations in a query plan may result in different execution times depending on the number of tables the rules engine has to select to perform each join operation. The compiler in these embodiments can be re-specified in order to re-order the join operations in a particular query plan when a certain order of the join operations in the particular query plan has resulted in a long execution time to perform the join operations.

The event processor 622 of the rules engine 625 detects the occurrence of each input table event. The event processor of different embodiments detects the occurrence of an input table event differently. In some embodiments, the event processor registers for callbacks with the RE input tables for notification of changes to the records of the RE input tables. In such embodiments, the event processor 622 detects an input table event when it receives notification from a RE input table that one of its records has changed.

In response to a detected input table event, the event processor 622 (1) selects the appropriate query plan for the detected table event, and (2) directs the table processor 630 to execute the query plan. To execute the query plan, the table processor 630 in some embodiments performs the join operations specified by the query plan to produce one or more records that represent one or more sets of data values from one or more input and miscellaneous tables 610 and 615. The table processor 630 of some embodiments then (1) performs a select operation to select a subset of the data values from the record(s) produced by the join operations, and (2) writes the selected subset of data values in one or more RE output tables 645.

In some embodiments, the RE output tables 645 store both logical and physical network element data attributes. The tables 645 are called RE output tables as they store the output of the table mapping operations of the rules engine 625. In some embodiments, the RE output tables can be grouped in several different categories. For instance, in some embodiments, these tables can be RE input tables and/or virtualization-application (VA) output tables. A table is a RE input table when a change in the table causes the rules engine to detect an input event that requires the execution of a query plan. A RE output table 645 can also be a RE input table 610 that generates an event that causes the rules engine to perform another query plan after it is modified by the rules engine. Such an event is referred to as an internal input event, and it is to be contrasted with an external input event, which is an event that is caused by a RE input table modification made by the control application 605 or the NIB monitor 650.

A table is a virtualization-application output table when a change in the table causes the NIB publisher 655 to publish a change to the NIB 660. A table in the RE output tables 645 can be a RE input table 610, a VA output table, or both a RE input table 610 and a VA output table.

The NIB publisher 655 detects changes to the VA output tables 2005 of the RE output tables 645. The NIB publisher of different embodiments detects the occurrence of a VA output table event differently. In some embodiments, the NIB publisher registers for callbacks with the VA output tables for notification of changes to the records of the VA output tables. In such embodiments, the NIB publisher 655 detects an output table event when it receives notification from a VA output table that one of its records has changed.

In response to a detected output table event, the NIB publisher 655 takes each modified data tuple in the modified VA output tables and propagates this modified data tuple into the NIB 660 through the APIs provided by the NOS 665. After a new data tuple is propagated to the NIB by the NIB publisher 655, the NOS 665 propagates, if needed, a NIB data tuple that was modified because of the propagated VA output table data tuple to one or more of the managed switching elements. In doing this, the NOS completes the deployment of the LDPS (e.g., one or more logical switching configurations) to one or more managed switching elements as specified by the NIB records.

As the VA output tables store both logical and physical network element data attributes in some embodiments, the NIB 660 in some embodiments stores both logical and physical network element attributes that are identical or derived from the logical and physical network element data attributes in the output tables 645. In other embodiments, however, the NIB only stores physical network element attributes that are identical or derived from the physical network element data attributes in the output tables 645.

The NIB monitor 650 interfaces with the NIB 660 to receive notifications regarding changes to the NIB. The NIB monitor of different embodiments detects the occurrence of a change in the NIB differently. In some embodiments, the NIB monitor registers for callbacks with the NIB for notification of changes to one or more records in the NIB. In such embodiments, the NIB monitor 650 detects NIB change event when it receives notification from the NIB that one of its records has changed. In response to a detected NIB change event, the NIB monitor 650 may modify one or more RE input tables 610, which, in turn, may cause one or more RE input table event to occur that then initiates the execution of one or more query plans by the rules engine. In other words, the NIB monitor writes some or all of the information that it receives from the NIB into the input tables 610, so that the state and configuration of the managed switching elements can be accounted for while generating the NIB data tuples through the mapping operations. Each time the managed switching configuration or underlying managed switching element state changes, the NIB monitor 650 may update the input table records 610 so that the generated NIB data tuples can be updated to reflect the modified switching configuration or underlying switching element state.

In some embodiments, the NIB monitor 650 is a collection of input objects (or functions) associated with the RE input tables. Each input object in some embodiments is associated with one RE input table and is responsible for modifying its associated input table in response to a change in the NIB. Each input object in some embodiments registers with one or more NIB objects for callback notifications upon the occurrence of changes to the NIB object(s). Similarly, in some embodiments, the NIB publisher 655 is a collection of output objects (or functions) associated with the VA output tables. Each output object in some embodiments is associated with one VA output table and is responsible for propagating changes in its associated output table to the NIB. As such, in some embodiments, the NIB monitor is a conceptual representation of the input and output objects that register with the NIB for callbacks.

The query manager 620 interfaces with the control application 605 to receive queries regarding LDPS data. As shown in FIG. 6, the manager 620 of some embodiments also interfaces with the NIB 660 in order to query the NIB to provide the control application state information regarding the network elements in the LDPS' for the different user. In other embodiments, however, the query manager 620 queries the output tables 645 to obtain LDPS data for the control application.

E. Integrated Application

As mentioned above, the control application and the virtualization application of some embodiments are two separate applications that operate on the same machine or different machines in some embodiments. Other embodiments, however, implement these two applications as two modules of one integrated application, with the control application module 3005 generating LDPS in the logical forwarding plane and the virtualization application generating physical data path sets in the physical control plane.

Figure 7:
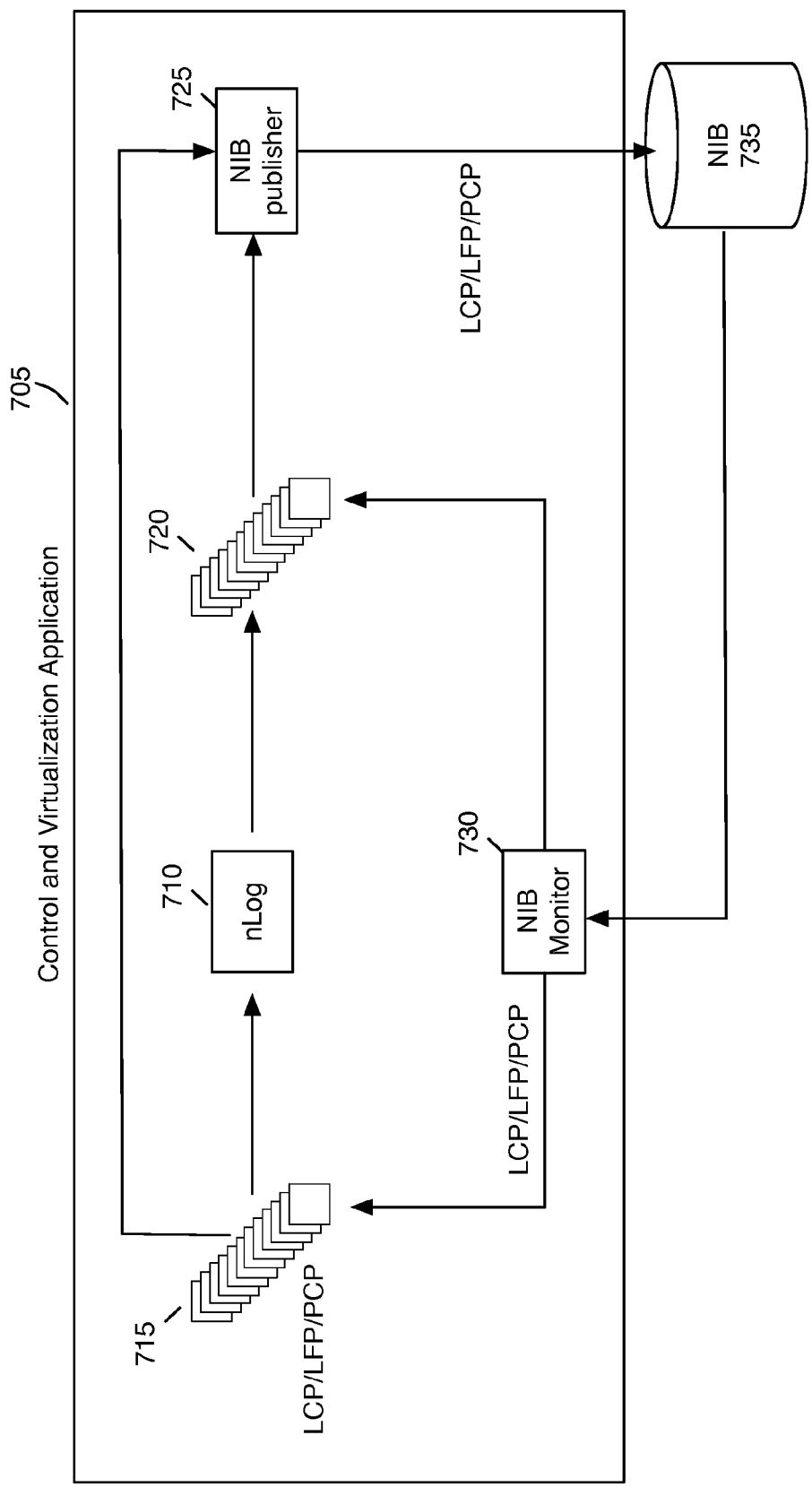
FIG. 7 illustrates an integrated control/virtualization application of some embodiments.

Still other embodiments integrate the control and virtualization operations of these two applications within one integrated application, without separating these operations into two separate modules. FIG. 7 illustrates an example of such an integrated application 705. This application 705 uses an nLog table mapping engine 710 to map data from an input set of table 715 to an output set of tables 720, which like the above described embodiments, may include one or more tables in the input set of tables. The input set of tables in this integrated application may include LCP data that need to be mapped to LFP data, or it may include LFP data that need to be mapped to PCP data.

In this integrated control/virtualization application 705, a NIB publisher 725 publishes input table records and output table records to the NIB 735. A NIB monitor 730 then receives notification of changes to the NIB 735 (e.g., managed switch changes detected by the NOS or NIB changes pushed by the other controller instances), and for some notifications (e.g., those relating to the LDPS' for which the application is the master), pushes changes to the input and/or tables 715 and 725.

II. NETWORK HYPERVISOR

Given the previous description of the physical network responsibilities, the network hypervisor of some embodiments maintains the following state at each switch in the network: (1) a table to map incoming packets to their logical forwarding context, (2) rules for logical forwarding decisions, (3) a table to map a logical egress port to a physical location, and (4) a physical forwarding table. In other embodiments, the network hypervisor maintains only the first three of these, while leaving the maintenance of the physical forwarding tables (e.g., the L3 tables) to the existing physical forwarding plane controls. In other words, standard routing protocols (such as OSPF or ISIS) are well suited for populating the physical forwarding tables. However, some embodiments also require some method for determining logical to physical mappings, and distributing the logical forwarding rules across the physical network. This is the responsibility of the network hypervisor in these embodiments.

The network hypervisor of some embodiments maintains a global view of all physical resources in the network and all configured logical forwarding planes. Its primary function is to map the logical forwarding plane to the underlying hardware efficiently. In some embodiments, the network hypervisor can also maintain these mappings whenever the physical network changes (component addition, removal, or failure) or the logical forwarding plane is modified.

While conceptually there is no restriction on how a hypervisor can be implemented, in some embodiments, it is decoupled from the physical forwarding elements and implemented as a distributed system. In this section, a particular implementation of some embodiments will be described, including how the logical to mappings are maintained, and the algorithm used to place logical forwarding rules within the network.

As mentioned above, some embodiments provide a method for scaling out the full spectrum of network functionality, not just basic packet delivery. To this end, some embodiments introduce the network hypervisor as a software layer between the physical forwarding plane and the control plane that abstracts the physical hardware as one or more logical forwarding elements. In some embodiments, a network hypervisor is responsible for distributing the necessary state amongst the physical forwarding elements (switches) and handling the multiplexing of physical resources amongst logical contexts.

There are a number of approaches that would be suitable for realizing the conceptual design of the network hypervisor. Some embodiments implement a network hypervisor as a logically centralized, physically distributed system that communicates with switches using an OpenFlow-based protocol with support for multiple tables and tunnel management.

A. Physical Switch

Some embodiments treat a physical switch analogously to a line card in a chassis-based network switch or router. In this analogy, the physical forwarding is similar to forwarding between line cards, and the logical forwarding is the inbound/outbound forwarding by the line cards. Common practices in chassis design may be used to guide switch specification.

The physical switch of some embodiments may have a method for quickly detecting link and tunnel status changes. These mechanisms are used to signal to the hypervisor for any status changes. The switch of some embodiments may also support some sort of multi-path (e.g., ECMP or other hashing scheme) to load balance the traffic between physical addresses.

To support the separation of logical and physical addressing, the switch of some embodiments provides a tunneling mechanism. In some embodiments, L2 over GRE may be used. The L2 packets are relevant within the logical context, and the GRE tunnels provide the physical transport. In some embodiments, the lookup that maps the L2 packets to the tunnels is the logical forwarding decision and is populated by the network hypervisor. The decision about which physical port to send a tunneled packet out of is the physical forwarding decision, and is determined via a standard routing protocol.

All of these functions are available on merchant silicon chipsets today. Both Broadcom and Marvell have chipsets that support rule based tunnel lookup for L2 over L3. 802.1ag and ECMP are also commonly supported in hardware today.

B. Network Hypervisor Operations

In some embodiments, the network hypervisor is built as a distributed system that operates as an OpenFlow controller. The network hypervisor connects with every switch in the network and uses a simple discovery mechanism to create an in-memory graph of the network. Given the network graph, the network hypervisor of some embodiments maps the logical forwarding plane to the physical network, and maintain these mappings as the physical network changes either through a hardware failure or component addition or removal. The hypervisor of some embodiments also provides an API which allows for the creation and configuration of logical forwarding elements as well as where they tie into the physical network.

In some embodiments, the job of the hypervisor is complicated by the fact that it multiplexes the logical context over limited physical bandwidth and lookup table space. These complications will now be discussed.

Bisectional Bandwidth:

Ideally, in some embodiments, logical forwarding elements can be declared with a given bisectional bandwidth that is enforced by the hypervisor. This is difficult to maintain in general over arbitrary topologies. For example, a single logical forwarding plane distributed across multiple physical switches may be constrained by a single oversubscribed link. Some embodiments deal with this problem by relying on load balancing of flows at the physical layer to uniformly consume physical forwarding bandwidth. While it tries to be efficient and fair, this approach does not guarantee a minimum bisectional bandwidth.

Port Bandwidth:

In some embodiments, a logical port may be implemented as a tunnel that traverses multiple physical elements. In order to provide minimum port speed guarantees, each element of some embodiments supports the capacity and isolates it from other traffic. Limitations on the number of queues in standard switching silicon makes this difficult to enforce in general. Regarding this issue, some embodiments assume over-provisioned end-to-end physical bandwidth.

TCAM Space:

When placing logical forwarding rules, the hypervisor of some embodiments considers the finite capacity of the physical forwarding tables. Unfortunately, unlike virtual memory in operating systems, the extreme performance demands of some network environments limits the practicality of an on-demand approach to "paging-in" rules on packet misses. Rather, in some embodiments, rules of a logical context are in hardware somewhere within the network.

An implementation of some embodiments assumes that the physical network is a fat tree that leverages multi-pathing to provide some uniformity in bandwidth allocation. In some embodiments, the resource optimization problem only places logical forwarding at the edge of the network, leaving all higher tiers in the tree to operate as a simple physical backplane. Forwarding rules in some embodiments are not pushed up in the tree because, without replication, doing so limits multi-pathing. Thus, in some embodiments, the logical forwarding capacity is limited to that available in the first hop switches. In the next section, the logical rule placement problem is described more generally.

Placing Logical Rules.

In some embodiments, when the TCAM table capacity in the physical forwarding elements is a non-issue (for the particular control plane implementation), the network hypervisor's tasks are simplified because it can have all the logical forwarding state in every physical forwarding element. However, when the available physical TCAM resources are scarce, the hypervisor of some embodiments is more intelligent in the placement of the logical forwarding decisions within the physical network.

In a deployment where the physical network elements are not equal (in terms of the TCAM sizes), but some do have enough capacity for the logical forwarding tables, the network hypervisor of some embodiments may use these elements for logical forwarding decisions and then use the rest only for physical forwarding decisions. While the exact topological location of the high capacity physical forwarding elements can be left to be a deployment-specific issue, having them either in the edge as first-hop elements or in the core (where they are shared) are both reasonable starting points.

In some embodiments, when the deployment has no physical forwarding elements capable of holding the complete logical forwarding table(s), the hypervisor may partition the problem either by splitting the problematic logical lookup step to span multiple physical elements or using separate physical forwarding elements to implement separate logical lookup steps (if the logical forwarding is a chain of steps). In either case, the physical forwarding element of some embodiments may send the processed packets to the next physical forwarding element in a way that conveys the necessary context for the next to continue the processing where the previous physical forwarding stopped.

When the deployment specific limitations are somewhere between the above two extremes, the network hypervisor of some embodiments has an option to explicitly do trade-offs between the optimal forwarding table resource usage and optimal physical network bandwidth usage.

Finally, when the forwarding capacity of an individual element with the required capacity for the logical forwarding table(s) becomes a limiting factor, the hypervisor of some embodiments may exploit load-balancing over multiple such elements to circumvent this limit.

III. USE CASES

Some of the practical use cases for a network hypervisor of some embodiments will now be described.

Distributed Virtual Switch.

The rise of end-host virtualization has seen the emergence of a new networking layer within the hypervisor, as described in a publication from the 2009 Association for Computing Machinery Workshop on Hot Topics in Networks (HotNets) entitled "Extending Networking into the Virtualization Layer". This is generally realized as an L2 software switch (generally termed vswitch) that connects each co-resident VM on a physical host. The vswitch provides forwarding between hosts on the same VM as well as to/from the physical network. It may also provide some basic network visibility and control functions.

Even with the ability to control the network at the end-host, the dynamic nature of virtual environments (which may include end-host migration) makes network monitoring and configuration difficult. A preferable approach is to connect VMs to a distributed logical switch, which is topology independent (as is done with VMWare DVS, for example).

Some embodiments support a distributed virtual switch (provided the vswitches support the required table lookups). Further, this approach allows this support to be extended to physical switches allowing for non-virtualized end-hosts to participate on logical topologies.

Scale-Out Carrier-Grade Router.

In the core of the datacenters and edges of the wire-area networks, high capacity and fan-out IP routers are a requirement that is difficult to fulfill with commodity switching hardware today. While the capacity of individual ports is rapidly reaching the required 10 Gbps (and beyond) speeds, to this date the capacity of TCAMs as wells as available physical ports has rendered carrier-grade routers in this space the most attractive solution regardless of their steep prices.

In some embodiments, a network hypervisor based solution may replace a single carrier-grade router with a rack of commodity switches. In essence, the commodity switches are used to form a high capacity switching backplane that the network hypervisor then represents as a single logical switch for a standard (open-source) IGP/BGP routing stack control plane implementation. In this model, logical ports correspond to the physical ports used to interconnect this single "router in a rack" to its next hops, and the routing stack pushes its FIB (not assuming per ingress port FIBs here for simplicity) to the forwarding table of the logical switch, which is then distributed to the physical switches by the network hypervisor. Port status information is mapped back to the logical ports and the routing stack communicates with its peer by sending/receiving over the logical ports.

The switches are interconnected with a fat-tree like topology to achieve sufficient bisectional bandwidth, and therefore, the network hypervisor of some embodiments has a simple task to allocate sufficient bandwidth capacity between any logical ports. If the TCAM capacity of a commodity switch were not sufficient to hold a full FIB computed by the routing stack, the network hypervisor of some embodiments may split the FIB over multiple physical switches. Similarly, because there are no multiple control plane implementations sharing the same physical switches, there is no need for the mapping between physical and logical context (and vice versa) as discussed in section I.

Multi-Tenant Network Architecture.

In a multi-tenant network environment, the physical network of some embodiments is shared among tenants so isolation between tenant networks is a strict requirement. While in modestly sized networks this is rather easily achievable with today's solutions (such as VLANs), these solutions are unworkable at the scale already seen in production multi-tenant networks, both in terms of scalability and management complexity. For instance, the number of available VLANs is rather limited and, as the number of tenant networks grows, the management of the required configuration state becomes extremely brittle.

The network hypervisor of some embodiments is perfectly suited to the multi-tenant challenge; it is sufficient for the hypervisor to allocate a logical switch per tenant and then map sufficient resources per logical switch. In some embodiments, the isolation is taken care of by the mappings between physical and logical contexts. In this case, the logical context just happens to correspond to the tenants.

Tenants may be provided with full (self-service) control over their dedicated logical switches, freeing further resources from the physical network management. For example, the tenants can modify per (logical) port ACLs and they can even see (logical) statistics for their traffic. Similarly, any constraints due to integration with external networks can be represented using logical abstractions within the logical network view the tenants are provided with. For IP connectivity, a logical router may represent the IP subnet allocated for the tenant. Then it is the network hypervisor's task to provide such IP connectivity for the logical network by appropriately interconnecting the physical switches to the IP connectivity.

IV. CONCLUSION

Some embodiments of the invention rather than requiring control planes to deal with the complicated and dynamic nature of physical networks, use the network hypervisor to allow them to specify the desired behavior in terms of a simple logical abstraction that is completely under their control. In some embodiments, the network hypervisor then assumes the responsibility of implementing this abstraction on the underlying physical network.

In some embodiments, the goal of the network hypervisor is to allow operators (or, more generally, control planes) to express their desires abstractly and then harness the aggregate switching and forwarding capabilities of a set of physical elements to implement the desired behavior. The details of how to route packet through the network, and where various functions (such as ACLs) are exercised, should be completely hidden from the control plane.

There are certainly cases where using more than a single logical forwarding element can be useful. In the case of links with significantly longer latencies than other links, the control plane should be aware of such performance discrepancies. For example, while a single datacenter may be exposed as single forwarding element, two datacenters connected by a long haul link should probably be represented as two logical nodes connected by a single link. In addition, there are some control policies that are more compactly expressed by using more than one logical forwarding element (e.g., if the desired functionality requires a pipeline of forwarding functions).

So it may be that, as this approach becomes more widely used, multiple logical forwarding elements become the typical case. However, the basic goal remains that the logical abstraction is only as complicated as needed to express the desired behavior, and completely shields the control plane from the details of the underlying physical infrastructure. Thus, one should not think of multiple logical forwarding elements as a large and complicated network, but as a minimal specification of desired behavior.

Some embodiments of the invention may not provide a mechanism for network slicing or a method of reconstructing arbitrary network topologies as is often proposed for creating network testbeds. Generally, these proposals advocate building a logical model that emulates the physical world for purposes of experimentation of the physical forwarding protocols. Thus, the three areas of focus tend to be realism (it looks like a physical network), isolation (experiments cannot interfere with each other or legitimate traffic), and flexibility (it is simple to create arbitrary configurations).

These approaches are often described as "network virtualization", but the term is used quite differently here. In the broader systems literature, virtualization refers to the act of decoupling the (logical) service from its (physical) realization. In particular, the virtualized service may be implemented by a single physical component shared by multiple virtualized services or by using multiple physical resources to implement a single logical service.

In some embodiments, the network hypervisor closely matches with the classic definition of the virtualization as it can both partition the physical network and build logical forwarding elements exceeding the capacity of any physical forwarding element. Accordingly, some embodiments of the invention focus on the problem of partitioning a single resource through the use of multiple contexts, as well as distributing the logical context over multiple physical elements.

In contrast, slicing focuses on the former problem, by partitioning the physical forwarding space either through consuming physical ports, or partitioning address or tag space. Slicing does not provide the means for distributing the logical state across multiple physical elements, a key component of scale-out design.

IV. ELECTRONIC SYSTEM

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 8 conceptually illustrates an electronic system 800 with which some embodiments of the invention are implemented. The electronic system 800 can be used to execute any of the control, virtualization, or operating system applications described above. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. For example, the various memory units include instructions for processing multimedia clips in accordance with some embodiments. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIG. 3) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A network controller instance for managing a network comprising a plurality of physical forwarding elements, the network controller instance comprising:
    a set of processing units; and
    a machine readable medium storing, for execution by the set of processing units:
        a control application for enabling a plurality of tenants to define logical forwarding elements and associated logical gateways, wherein each particular logical forwarding element specifies logical connections between virtual machines (VMs) in a set of VMs and the associated logical gateway for the particular logical forwarding element specifies a connection between the set of VMs and other entities that do not connect to the logical forwarding element, wherein different tenants specify different switching configurations for the logical forwarding elements while remaining insulated from a topology of the network;
        a network hypervisor for generating provisioning data for provisioning sets of the physical forwarding elements to implement the logical forwarding elements; and
        a network operating system for distributing the provisioning data to the sets of physical forwarding elements in order for the physical forwarding elements in the sets to implement the logical forwarding elements.

2. The network controller instance of claim 1, wherein the control application and the network hypervisor execute on the same computer.

3. The network controller instance of claim 1, wherein the controller instance is one of several controller instances in a distributed network control system, wherein each of the controller instances comprises a control application, a network hypervisor, and a network operating system.

4. The network controller instance of claim 1, wherein a particular logical forwarding element includes at least one logical port which is bound by the network hypervisor to a physical port of one of the physical forwarding elements that implement the logical forwarding element.

5. The network controller instance of claim 1, wherein the network operating system comprises a network state data structure that stores the provisioning data for distribution to the physical forwarding elements.

6. The network controller instance of claim 5, wherein the network controller instance shares the data stored in the network state data structure with other network controller instances that manage the plurality of physical forwarding elements.

7. The network controller instance of claim 1, wherein the logical gateway provides a bridge between the set of VMs and the other entities such that migration of the VMs between host machines is hidden from the other entities.

8. The network controller instance of claim 1, wherein the logical gateway is allocated an IP address used by the VMs in the set of VMs as a next hop for communication with the other entities that are not connected to the logical forwarding element.

9. The network controller instance of claim 1, wherein the logical forwarding element comprises a logical data path set that defines switching logic for the connections between the VMs in the set of VMs.

10. The network controller instance of claim 9, wherein the network hypervisor is for mapping the logical data path set as defined by a user to the set of physical forwarding elements.

11. A network controller instance for managing a network comprising a plurality of physical forwarding elements, the network controller instance comprising:
    a set of processing units; and
    a machine readable medium storing, for execution by the set of processing units:
        a control application for enabling definition of a logical forwarding element and an associated logical gateway, wherein the logical forwarding element specifies logical connections between virtual machines (VMs) in a set of VMs and includes a L2 table, a L3 table, an access control list (ACL) table, and a set of logical line cards that specify control functionalities and rules for the logical forwarding element, wherein the associated logical gateway specifies a connection between the set of VMs and other entities that do not connect to the logical forwarding element;
        a network hypervisor for generating provisioning data for provisioning a set of the physical forwarding elements to implement the logical forwarding element; and
        a network operating system for distributing the provisioning data to the set of physical forwarding elements in order for the physical forwarding elements in the set to implement the logical forwarding element.

12. The network controller instance of claim 11, wherein the control application is further for enabling definition of a second logical forwarding element and an associated logical gateway, and the network hypervisor is further for generating provisioning data for provisioning a second set of physical forwarding elements to implement the second logical forwarding element.

13. The network controller instance of claim 12, wherein the first set of physical forwarding elements and the second set of physical forwarding elements shares at least one physical forwarding element.

14. The network controller instance of claim 11, wherein the controller instance is one of several controller instances in a distributed network control system, wherein each of the controller instances comprises a control application, a network hypervisor, and a network operating system.

15. A network controller instance for managing a network comprising a plurality of physical forwarding elements in a network, the network controller instance comprising:
    a set of processing units; and
    a machine readable medium storing, for execution by the set of processing units:

a control application for enabling definition of (i) a first logical forwarding element and a first logical gateway associated with the first logical forwarding element and (ii) a second logical forwarding element and a second logical gateway associated with the second logical forwarding element, wherein the first logical forwarding element specifies logical connections between virtual machines (VMs) in a first set of VMs and the first logical gateway specifies a connection between the first set of VMs and other entities that do not connect to the logical forwarding element, wherein the second logical forwarding element specifies logical connections between VMs in a second set of VMs and the second logical gateway specifies a connection between the second set of VMs and other entities that do not connect to the second logical forwarding element;

a network hypervisor for generating provisioning data for provisioning (i) a first set of the physical forwarding elements to implement the first logical forwarding element and (ii) a second set of the physical forwarding elements to implement the second logical forwarding element; and a network operating system for distributing the provisioning data to the first and second sets of physical forwarding elements in order for the physical forwarding elements in the first and second sets to implement the first and second logical forwarding elements, respectively.

16. The network controller instance of claim 15, wherein the logical gateway associated with the first logical forwarding element is the same as the logical gateway associated with the second logical forwarding element.

17. The network controller instance of claim 15, wherein the first set of physical forwarding elements and the second set of physical forwarding elements share at least one physical forwarding element.

18. For a network controller, a method for managing a network comprising a plurality of physical forwarding elements that forward data packets, the method comprising:

receiving a definition of a logical forwarding element and an associated logical gateway, wherein the logical forwarding element specifies logical connections between virtual machines (VMs) in a set of VMs and the associated logical gateway specifies a connection between the set of VMs and other entities that do not connect to the logical forwarding element, wherein the logical gateway is allocated an IP address used by the VMs in the set of VMs as a next hop for communication with the other entities that are not connected to the logical forwarding element;

generating provisioning data for provisioning a set of the physical forwarding elements to implement the logical forwarding element; and propagating the provisioning data to the set of physical forwarding elements in order for the physical forwarding elements in the set to implement the logical forwarding element.

19. The method of claim 18 further comprising storing the provisioning data in a network state data structure, wherein the network controller shares data through the network state data structure with other network controllers that manage the plurality of physical forwarding elements.

20. The method of claim 18, wherein the logical gateway provides a bridge between the set of VMs and the other entities such that migration of the VMs between host machines is hidden from the other entities.

* * * * *